United States Patent
Deshmukh et al.

(10) Patent No.: US 11,243,964 B2
(45) Date of Patent: *Feb. 8, 2022

(54) QUERY DECOMPOSITION FOR SCALABILITY OF CONTINUOUS QUERY PROCESSING

(71) Applicant: Oracle International Corporation, Redwood Shores, CA (US)

(72) Inventors: Unmesh Anil Deshmukh, Nagpur (IN); Hoyong Park, San Jose, CA (US); Sandeep Bishnoi, Pleasanton, CA (US); Prabhu Thukkaram, San Ramon, CA (US)

(73) Assignee: Oracle International Corporation, Redwood Shores, CA (US)

(*) Notice: Subject to any disclaimer, the term of this patent is extended or adjusted under 35 U.S.C. 154(b) by 468 days.

This patent is subject to a terminal disclaimer.

(21) Appl. No.: 16/376,984

(22) Filed: Apr. 5, 2019

(65) Prior Publication Data

US 2019/0236070 A1 Aug. 1, 2019

Related U.S. Application Data

(63) Continuation of application No. 15/084,269, filed on Mar. 29, 2016, now Pat. No. 10,303,695.

(60) Provisional application No. 62/244,434, filed on Oct. 21, 2015, provisional application No. 62/244,447, filed on Oct. 21, 2015.

(51) Int. Cl.
*G06F 16/2458* (2019.01)
*G06F 16/2452* (2019.01)
*G06F 16/9535* (2019.01)
*G06F 16/2455* (2019.01)
*G06F 16/2453* (2019.01)

(52) U.S. Cl.
CPC ...... *G06F 16/2471* (2019.01); *G06F 16/2452* (2019.01); *G06F 16/24535* (2019.01); *G06F 16/24568* (2019.01); *G06F 16/9535* (2019.01)

(58) Field of Classification Search
CPC ........... G06F 16/2471; G06F 16/24535; G06F 16/2452; G06F 16/9535; G06F 16/24568
USPC ........................................ 707/713, 718, 770
See application file for complete search history.

(56) References Cited

U.S. PATENT DOCUMENTS

| | | |
|---|---|---|
| 6,128,610 A | 10/2000 | Srinivasan et al. |
| 6,748,386 B1 | 6/2004 | Li |
| 7,020,696 B1 | 3/2006 | Perry et al. |

(Continued)

OTHER PUBLICATIONS

U.S. Appl. No. 12/506,891, Non-Final Office Action dated Dec. 14, 2011, 18 pages.

(Continued)

*Primary Examiner* — Phong H Nguyen

(74) *Attorney, Agent, or Firm* — Kilpatrick Townsend & Stockton LLP

(57) ABSTRACT

Systems and methods for query decomposition for scalability of continuous query processing are disclosed. In some examples, it is determined whether a query is fully stateful. If it is, the query may be divided into two functions, an aggregate function and a global function. The aggregate functions may be distributed across multiple distributed nodes and executed in parallel. The global function may then receive the results from the distributed nodes and join the results to achieve the fully stateful result.

17 Claims, 11 Drawing Sheets

(56) References Cited

U.S. PATENT DOCUMENTS

| | | | |
|---|---|---|---|
| 7,912,853 B2 | 3/2011 | Agrawal | |
| 8,321,450 B2 | 11/2012 | Thatte et al. | |
| 8,387,076 B2* | 2/2013 | Thatte | G06F 9/541 |
| | | | 719/328 |
| 9,805,095 B2* | 10/2017 | Deshmukh | G06F 16/24544 |
| 10,303,695 B2 | 5/2019 | Deshmukh et al. | |
| 10,496,640 B2* | 12/2019 | Taylor | G06F 16/24534 |
| 2003/0229652 A1 | 12/2003 | Bakalash et al. | |
| 2004/0010496 A1 | 1/2004 | Behrendt et al. | |
| 2008/0281782 A1 | 11/2008 | Agrawal | |
| 2009/0070785 A1* | 3/2009 | Alvez | G06F 9/541 |
| | | | 719/318 |
| 2009/0076899 A1 | 3/2009 | Gbodimowo | |
| 2009/0144696 A1* | 6/2009 | Andersen | G06F 16/289 |
| | | | 717/109 |
| 2010/0094838 A1 | 4/2010 | Kozak | |
| 2011/0314019 A1 | 12/2011 | Jimenez Peris et al. | |
| 2013/0204896 A1 | 8/2013 | Jimenez Peris et al. | |
| 2014/0095444 A1* | 4/2014 | Deshmukh | G06F 16/24542 |
| | | | 707/661 |
| 2014/0095445 A1* | 4/2014 | Deshmukh | G06F 16/24542 |
| | | | 707/661 |
| 2014/0095483 A1* | 4/2014 | Toillion | G06F 16/2477 |
| | | | 707/722 |
| 2014/0172833 A1* | 6/2014 | Taylor | G06F 16/24534 |
| | | | 707/722 |
| 2017/0116289 A1 | 4/2017 | Deshmukh et al. | |

OTHER PUBLICATIONS

U.S. Appl. No. 12/506,891, Notice of Allowance dated Jul. 25, 2012, 8 pages.

U.S. Appl. No. 12/506,905, Final Office Action dated Aug. 9, 2012, 34 pages.

U.S. Appl. No. 12/506,905, Non-Final Office Action dated Mar. 26, 2012, 61 pages.

U.S. Appl. No. 12/506,905, Notice of Allowance dated Dec. 14, 2012, 9 pages.

U.S. Appl. No. 15/084,269, First Action Interview Office Action Summary dated Oct. 22, 2018, 6 pages.

U.S. Appl. No. 15/084,269, First Action Interview Pilot Program PreInterview Communication dated Jul. 24, 2018, 4 pages.

U.S. Appl. No. 15/084,269, Notice of Allowance dated Feb. 21, 2019, 10 pages.

De Matteis et al., Parallel Patterns for Window-Based Stateful Operators on Data Streams: An Algorithmic Skeleton Approach, International Journal of Parallel Programming, Mar. 25, 2016, 20 pages.

De Matteis et al., Parallel Patterns for Window-Based Stateful Operators on Data Streams: An Algorithmic Skeleton Approach, Presentation at the International Symposia on High-Level Parallel Programming and Applications, Jul. 2015, 23 pages.

Fora, Stateful Stream Processing, Available online at C:\Users\ r1h\AppData\Local\Microsoft\Windows\TemporaryInternetFiles\Co ntent.Outlook\DMYCJ9KL\StatefulStream Processing-ApacheFlink-ApacheSoftwareFoundation.html, Jul. 27, 2015, 6 pages.

Freedman, Craig Freedman's SQL Server Blog Craig Freedman's SQL Server Blog, Available online at C:\Users\r1h\AppData\Loca l\Microsoft\Windows\TemporaryInternetFiles\Content. Outlook\DMYCJ9KL\Partial Aggregation_ CraigFreedmansSQLServerBlog.html, Jan. 18, 2008, 5 pages.

Kotto-Kombi et al., Parallel and Distributed Stream Processing: Systems Classification and Specific Issues, HAL Id: hal-01215287, Available Online at https://hal.archives-ouvertes.fr/hal-01215287, Oct. 13, 2015, 26 pages.

Liu et al., Adapting State-Intensive Non-Blocking Queries Over Distributed Environments, Worcester Polytechnic Institute Department of Computer Science, Available online at: http://digitalcommons. wpi.edu/computerscience-pubs/79, Mar. 11, 2005, 33 pages.

Schneider et al., Auto-Parallelizing Stateful Distributed Streaming Applications, Proceedings of the 21st International Conference on Parallel Architectures and Compilation Techniques, Sep. 19-23, 2012, pp. 53-64.

Wu et al., Parallelizing Stateful Operators in a Distributed Stream Processing System: How, Should You and How Much, DEBS '12 Proceedings of the 6th ACM International Conference on Distributed Event-Based Systems, Jul. 16-20, 2012, pp. 278-289.

* cited by examiner

```
Query-Type = Stateless //Default value is stateless

//Checks for Fully-Stateful
IF((query has a window construct) AND (WindowType is RowWindow or ValueWindow or ValueRelationWindow))
OR
IF((query has a pattern clause) AND (pattern clause does not have partition by sub-clause))
OR
IF((query has an aggregation function in the select clause) AND (group by clause is not present))
{
    Query-Type = Fully-Stateful; return;
}

//Checks for Semi-Stateful
IF((query has a window construct) AND (WindowType is PartitionWindow))
OR
IF((query has a pattern clause) AND (pattern clause has partition by sub-clause))
OR
IF((query has an aggregation function in the select clause) AND (group by clause is present))
{
    Query-Type = Semi-Stateful; return;
}

//Remaining checks for Fully-Stateful should be done here after semi-stateful possibilities are ruled out.
IF(query has a Distinct clause) OR (query has an Order By clause) OR (Query has a RangeWindow)
    Query-Type = Fully-Stateful;

Return Query-Type;
```

FIG. 2

QUERY DECOMPOSITION FOR SCALABILITY OF CONTINUOUS QUERY PROCESSING

CROSS-REFERENCE TO RELATED APPLICATIONS

The present application is a continuation of, and claims the benefit and priority to U.S. application Ser. No. 15/084,269, filed Mar. 29, 2016, which claims the benefit and priority under 35 U.S.C. 119(e) of U.S. Provisional Application No. 62/244,434, filed Oct. 21, 2015, entitled "QUERY DECOMPOSITION FOR SCALABILITY OF FULLY STATEFUL CONTINUOUS QUERY PROCESSING," and U.S. Provisional Application No. 62/244,447, filed Oct. 21, 2015, entitled "CLASSIFICATION OF CONTINUOUS QUERIES ON THE BASIS OF STATE REQUIREMENTS," the entire contents of which are incorporated herein by reference for all purposes.

BACKGROUND

In traditional database systems, data is stored in one or more databases usually in the form of tables. The stored data is then queried and manipulated using a data management language such as a structured query language (SQL). For example, a SQL query may be defined and executed to identify relevant data from the data stored in the database. A SQL query is thus executed on a finite set of data stored in the database. Further, when a SQL query is executed, it is executed once on the finite data set and produces a finite static result. Databases are thus best equipped to run queries over finite stored data sets.

A number of modern applications and systems however generate data in the form of continuous data or event streams instead of a finite data set. Examples of such applications include but are not limited to sensor data applications, financial tickers, network performance measuring tools (e.g. network monitoring and traffic management applications), clickstream analysis tools, automobile traffic monitoring, and the like. Such applications have given rise to a need for a new breed of applications that can process the data streams. For example, a temperature sensor may be configured to send out temperature readings.

Managing and processing data for these types of event stream-based applications involves building data management and querying capabilities with a strong temporal focus. A different kind of querying mechanism is needed that comprises long-running queries over continuous unbounded sets of data. While some vendors now offer product suites geared towards event streams processing, these product offerings still lack the processing flexibility required for handling today's events processing needs.

SUMMARY

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

In some examples, a method may be performed that comprises (in some cases, all features can be performed by a computer system) receiving a query to be executed against an event stream and determining whether the query is fully stateful, stateless, or semi-stateful. If the query is determined to be fully stateful, the method may comprise dividing the query into a partial aggregator and a global aggregator, distributing the partial aggregator to a plurality of distributed nodes of a cluster of virtual machines, enabling parallel execution of each partial aggregator at each of the plurality of distributed nodes, enabling execution results of each partial aggregator to be joined at a global node, and enabling the global aggregator to compute a result at the global node that includes each of the execution results from each of the plurality of distributed nodes.

The query may be determined to be fully stateful if the query has a window construct and a type of the window construct is associated with "row," "value," or "value relation." Additionally, the query may be determined to be fully stateful if the query has a pattern clause and the pattern clause does not have a "partition by" sub-clause. Additionally, the query may be determined to fully stateful if the query has an aggregation function in the select clause and a "group by" sub-clause is not present. Further, the query may also be determined to be fully stateful if the query has a Distinct clause, the query has an Order By clause, or the query has a RangeWindow clause. In some examples, the query may be determined to be semi-stateful if the query has a window construct and a type of the window construct is associated with "partition." Further, the query may be determined to be semi-stateful if the query has a pattern clause and the pattern clause has a "partition by" sub-clause, or if the query has an aggregation function in the select clause and a "group by" sub-clause is present. In some cases, if the query is determined to not be fully stateful (e.g., it semi-stateful or stateless), the method may comprise distributing the query to the plurality of distributed nodes of the cluster of virtual machines, enabling parallel execution of the separate instances of the query at each of the plurality of distributed nodes, enabling execution results of each instance of the query to be joined at the global node, and enabling the global node that includes each of the execution results from each of the plurality of distributed nodes to compute a semi-stateful result or a stateless result based at least in part on whether the query was semi-stateful or stateless, respectively.

In some examples, computer-readable storage medium may be provided, with instructions for receiving a query to be executed against an event stream, determining whether the query is fully stateful, stateless, or semi-stateful, dividing the query into a partial aggregator and a global aggregator, distributing the partial aggregator to a plurality of distributed nodes of a cluster of virtual machines, enabling parallel execution of each partial aggregator at each of the plurality of distributed nodes, enabling execution results of each partial aggregator to be joined at a global node, and enabling the global aggregator to compute a result at the global node that includes each of the execution results from each of the plurality of distributed nodes. Further, in some examples, a system may be provided that is configured to receive a query to be executed against an event stream, determine that the query is fully stateful, divide the query into a partial aggregator and a global aggregator, distribute the partial aggregator to a plurality of distributed nodes of a cluster of virtual machines, enable parallel execution of each partial aggregator at each of the plurality of distributed nodes, enable execution results of each partial aggregator to be joined at a global node, and enable the global aggregator to compute a result at the global node that includes each of the execution results from each of the plurality of distributed nodes

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed disclosures, any of the presently described embodiments and/or examples, or the presently understood best mode of any innovations presented within this disclosure.

FIG. 2 is a block diagram that includes example pseudo-code for implementing an embodiment of the present disclosure.

DETAILED DESCRIPTION

Figure 1:
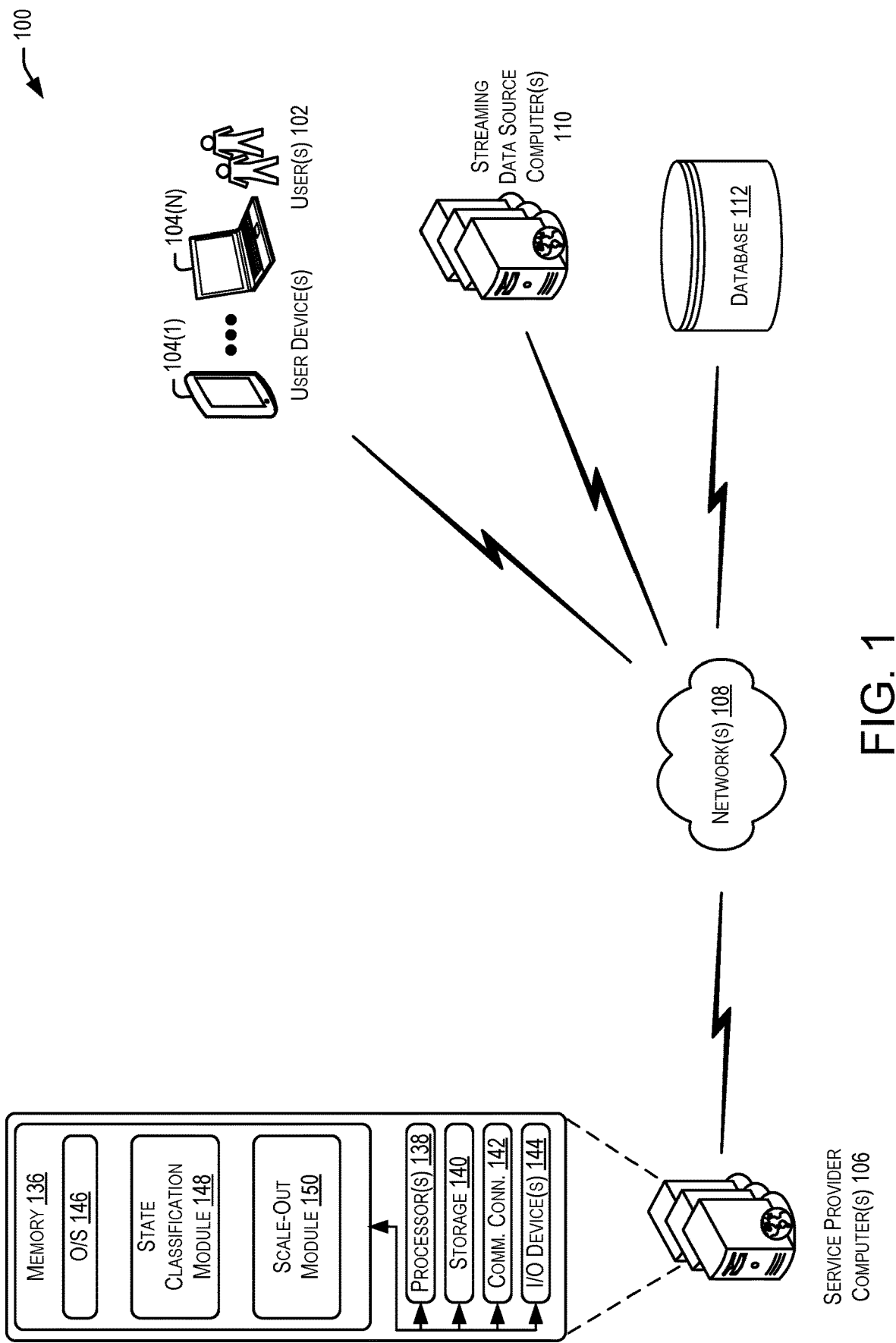
FIG. 1 is a simplified illustration of a system that may incorporate an embodiment of the present disclosure.

Complex Event Processing (CEP) allows users to author real-time event processing applications. The events coming into an event-processing system like CEP can arrive at a very high input event rate and for keeping up with that input data speed, it is essential that the system should be able to scale. Scaling refers to the ability of the system to maintain acceptable performance as the input rate grows. Scale-up is the ability of the system to effectively use cores/threads on a single machine (e.g., a high-end machine) whereas scale-out is its ability to effectively use multiple machines (e.g., simplistic machines, referred to herein as 'nodes' or 'brokers') that are part of a cluster by distributing the computation across these machines. Linear scalability is a desirable characteristic of a system and a system is said to be 'linearly scalable' when its throughput (events/sec) increases in proportion to the cluster size. So if with a single machine, the system is able to get a throughput of 'x' events/sec, then the system should get throughput of nearly '2x' with cluster of size two, '3x' with cluster of size three and so on, provided the rest of the application stays the same.

In this disclosure, the approach used in CEP to achieve linear scalability is detailed. The disclosure starts with the solution architecture and goes on to elaborate, with the help of examples, detailing the performance numbers obtained, and discusses how the solution fits with the two interfaces (e.g., JDeveloper/Eclipse plug-in and Stream Explorer) of CEP.

1 Overview

CEP provides a powerful platform for authoring real-time event processing applications. It achieves this through JDeveloper/Eclipse IDE based plug-in which provides the design time using which user can construct an Event Processing Network (EPN) which depicts the flow of events through the application. A simplistic EPN typically consists of Adapter (component which gets the data into CEP), Processor (component which declaratively specifies the business logic using one or more Continuous Query Language (CQL) queries) and Bean (POJOs which generally forward the output of CEP for subsequent action). All these components are interconnected by a component called 'Channel' which is associated with a specific 'Event type' (schema which identifies the structure of the event). Usability and ability to cope up with huge data rates are the two qualities paramount to success of any event processing system and CEP is no exception.

Recently, with the launch of Stream Explorer (SX) for CEP, all this complexity of wiring together an EPN is hidden from the end user. Using the easy-to-use, attractive UI of SX, user constructs what is referred as an 'Exploration' on top of a streaming source. Ability to compose these 'explorations' with one another to construct complex 'exploration' is also provided and common usage 'patterns' are also available out of the box in SX. An exploration internally is a CEP application which is constructed on-the-fly by SX. This constructed EPN generally has a stream followed by channel followed by a processor with a single CQL query. Thus SX improves the usability aspect of CEP.

Second requirement of coping up with huge data rates refers to the ability of the system to scale. Scale-up (making effective use of multiple cores/threads on the same machine) and scale-out (making effective use of multiple machines that are part of a cluster) are the two widely known terminologies. In earlier releases, CEP did provide a mechanism to scale-up by specifying ordering-constraints for a query and degree-of-parallelism (which can be viewed as number-of-threads) for a stream. If a query could not be executed as per the specified ordering-constraint then it will be defaulted to total-ordering which meant only one thread will process it. For example, if a query 'q1' is 'select max(c1) from S' and the ordering-constraint specified is 'partitioned' then since the aggregation is on the entire stream (no group-by in query q1) it will be defaulted to total-ordering. Thus this model had a possibility of creating confusion in the mind of user/developer. So we introduced the Local Partitioning Channel (LPC) construct which makes it easier to address the scale-up requirement. While defining LPC, user just has to specify the partitioning-attribute (attribute in the stream on which partitioning should happen) and max-threads (maximum number of threads to be used) parameters and set the is-local-partitioner property to true. Only queries that are semantically valid get registered against LPC and rest are flagged as errors during compile time. Internally for LPC, a 'partition stream' is created in the CQL Engine and as per value of max-threads parameter, those many copies of query plan are created. LPC has a thread pool executor and incoming event is hashed and sent to one of the max-threads queues each of which is processed by exactly one thread which continues execution into one of the copies of query plans within the CQL engine. The earlier hashed-value (at the time of determining the queue) is annotated with this thread and re-hashing within the engine is avoided. Hashing ensures all events with same value of partitioning-attribute go to the same queue/thread/copy of query plan. Thus LPC simplifies the usage of scale-up mechanism in CEP However, scale-out is more important requirement than scale-up since it is cheaper to get multiple commodity machines with simple hardware than getting one high-end machine with multiple cores and very expensive hardware. Further in cases when the input events are arriving on all the CEP nodes in the cluster rather than just one CEP node, it is important that CEP should have a good scale-out story. Ideal case is when it is linearly-scalable meaning as we add more CEP nodes, the throughput would increase in proportion of the cluster size. This document describes how CEP achieves linear scalability in a static (cluster size does not change once the application is deployed) CEP cluster.

A continuous data stream (also referred to as an event stream) may include a stream of data or events that may be continuous or unbounded in nature with no explicit end. Logically, an event or data stream may be a sequence of data elements (also referred to as events), each data element having an associated timestamp. A continuous event stream may be logically represented as a bag or set of elements (s, T), where "s" represents the data portion, and "T" is in the time domain. The "s" portion is generally referred to as a tuple or event. An event stream may thus be a sequence of time-stamped tuples or events.

In some aspects, the timestamps associated with events in a stream may equate to a clock time. In other examples, however, the time associated with events in an event stream may be defined by the application domain and may not correspond to clock time but may, for example, be represented by sequence numbers instead. Accordingly, the time information associated with an event in an event stream may be represented by a number, a timestamp, or any other information that represents a notion of time. For a system receiving an input event stream, the events arrive at the system in the order of increasing timestamps. There could be more than one event with the same timestamp.

In some examples, an event in an event stream may represent an occurrence of some worldly event (e.g., when a temperature sensor changed value to a new value, when the price of a stock symbol changed) and the time information associated with the event may indicate when the worldly event represented by the data stream event occurred.

For events received via an event stream, the time information associated with an event may be used to ensure that the events in the event stream arrive in the order of increasing timestamp values. This may enable events received in the event stream to be ordered based upon their associated time information. In order to enable this ordering, timestamps may be associated with events in an event stream in a non-decreasing manner such that a later-generated event has a later timestamp than an earlier-generated event. As another example, if sequence numbers are being used as time information, then the sequence number associated with a later-generated event may be greater than the sequence number associated with an earlier-generated event. In some examples, multiple events may be associated with the same timestamp or sequence number, for example, when the worldly events represented by the data stream events occur at the same time. Events belonging to the same event stream may generally be processed in the order imposed on the events by the associated time information, with earlier events being processed prior to later events.

The time information (e.g., timestamps) associated with an event in an event stream may be set by the source of the stream or alternatively may be set by the system receiving the stream. For example, in certain embodiments, a heartbeat may be maintained on a system receiving an event stream, and the time associated with an event may be based upon a time of arrival of the event at the system as measured by the heartbeat. It is possible for two events in an event stream to have the same time information. It is to be noted that while timestamp ordering requirement is specific to one event stream, events of different streams could be arbitrarily interleaved.

An event stream has an associated schema "S," the schema comprising time information and a set of one or more named attributes. All events that belong to a particular event stream conform to the schema associated with that particular event stream. Accordingly, for an event stream (s, T), the event stream may have a schema 'S' as (<time_stamp>, <attribute(s)>), where <attributes> represents the data portion of the schema and can comprise one or more attributes. For example, the schema for a stock ticker event stream may comprise attributes <stock symbol>, and <stock price>. Each event received via such a stream will have a time stamp and the two attributes. For example, the stock ticker event stream may receive the following events and associated timestamps:

. . .
(<timestamp_N>, <NVDA,4>)
(<timestamp_N+1>, <ORCL,62>)
(<timestamp_N+2>, <PCAR,38>)
(<timestamp_N+3>, <SPOT,53>)
(<timestamp_N+4>, <PDCO,44>)
(<timestamp_N+5>, <PTEN,50>)
. . .

In the above stream, for stream element (<timestamp_N+1>, <ORCL,62>), the event is <ORCL,62> with attributes "stock_symbol" and "stock_value." The timestamp associated with the stream element is "timestamp_N+1". A continuous event stream is thus a flow of events, each event having the same series of attributes.

As noted above, a stream may be the principle source of data that CQL queries may act on. Additionally, as noted, a stream S may be a bag (also referred to as a "multi-set") of elements (s, T), where "s" is in the schema of S and "T" is in the time domain. Additionally, stream elements may be tuple-timestamp pairs, which can be represented as a sequence of timestamped tuple insertions. In other words, a stream may be a sequence of timestamped tuples. In some cases, there may be more than one tuple with the same timestamp. And, the tuples of an input stream may be requested to arrive at the system in order of increasing timestamps. Alternatively, a relation (also referred to as a "time varying relation," and not to be confused with "relational data," which may include data from a relational database) may be a mapping from the time domain to an unbounded bag of tuples of the schema R. In some examples, a relation may be an unordered, time-varying bag of tuples (i.e., an instantaneous relation). In some cases, at each instance of time, a relation may be a bounded set. It can also be represented as a sequence of timestamped tuples that may include insertions, deletes, and/or updates to capture the changing state of the relation. Similar to streams, a relation may have a fixed schema to which each tuple of the relation may conform. Further, as used herein, a continuous query may generally be capable of processing data of (i.e., queried against) a stream and/or a relation. Additionally, the relation may reference data of the stream.

In some examples, a tuple and an event are different terms for the same concept. However, the formats may be different. In some cases, an "event" is the term used for input and output of a stream. An event may be received and/or provided as output of a stream processor. However, the data of the event may be stored in a tuple. As such, a "tuple" may be a CQL engine construct (object) for storing the data of the events. As such, the properties of an event may become the properties of a tuple; however, they may be in a different form. In some examples, the physical form (e.g., the data structure) may be the biggest difference between an event and a tuple. In some examples, the input event or the output event may be tied to the input or output system, respectively. However, a tuple may be a generic type of object that can store the attributes, properties, etc. of the events. In memory, sometimes the tuple may take the form of an array. For example, an event may be received as XML data, which may be parsed and stored in a different form. The XML event may include many different data points (elements), for example, time, stock price, etc. Based at least in part on a CQL statement from a user, only one (or some subset) of the attributes may be stored in an array as the tuple.

In some cases, the CQL engine may not need to know every property of an incoming event. As an example, a stock symbol event may be received. The stock symbol event may include many properties, including: time, stock price, bid price, symbol name, offer price, buy price, etc. However, the tuple may only store some of the values that were selected by the user (e.g., based at least in part on the particular CQL query). As such, only the interesting parts are stored in the tuple.

FIG. 1 depicts a simplified example system or architecture 100 in which techniques for the scalability of queries may be implemented. In architecture 100, one or more users 102 (e.g., account holders) may utilize user computing devices 104(1)-(N) (collectively, "user devices 104") to access one or more service provider computers 106 via one or more networks 108. In some aspects, the service provider computers 106 may also be in communication with one or more streaming data source computers 110 and/or one or more databases 112 via the networks 108. For example, the users 102 may utilize the service provider computers 106 to access or otherwise manage data of the streaming data source computers 110 and/or the databases 112 (e.g., queries may be run against either or both of 110, 112). The databases 112 may be relational databases, SQL servers, or the like and may, in some examples, manage historical data, event data, relations, archived relations, or the like on behalf of the users 102. Additionally, the databases 112 may receive or otherwise store data provided by the streaming data source computers 110. In some examples, the users 102 may utilize the user devices 104 to interact with the service provider computers 106 by providing queries (also referred to as "query statements") or other requests for data (e.g., historical event data, streaming event data, etc.). Such queries or requests may then be executed by the service provider computers 106 to process data of the databases 112 and/or incoming data from the streaming data source computers 110. Further, in some examples, the streaming data source computers 110 and/or the databases 112 may be part of an integrated, distributed environment associated with the service provider computers 106.

In some examples, the networks 108 may include any one or a combination of multiple different types of networks, such as cable networks, the Internet, wireless networks, cellular networks, intranet systems, and/or other private and/or public networks. While the illustrated example represents the users 102 accessing the service provider computers 106 over the networks 108, the described techniques may equally apply in instances where the users 102 interact with one or more service provider computers 106 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 106 via the networks 108, or via other network connections. Further, the user devices 104 may also be configured to provide one or more queries or query statements for requesting data of the databases 112 (or other data stores) to be processed.

In some aspects, the service provider computers 106 may also be any type of computing devices such as, but not limited to, mobile, desktop, thin-client, and/or cloud computing devices, such as servers. In some examples, the service provider computers 106 may be in communication with the user devices 104 via the networks 108, or via other network connections. The service provider computers 106 may include one or more servers, perhaps arranged in a cluster, as a server farm, or as individual servers not associated with one another. These servers may be configured to perform or otherwise host features described herein including, but not limited to, the management of archived relations, configurable data windows associated with archived relations, and/or accurately counting change events associated with managing archived relations described herein. Additionally, in some aspects, the service provider computers 106 may be configured as part of an integrated, distributed computing environment that includes the streaming data source computers 110 and/or the databases 112.

In one illustrative configuration, the service provider computers 106 may include at least one memory 136 and one or more processing units (or processor(s)) 138. The processor(s) 138 may be implemented as appropriate in hardware, computer-executable instructions, firmware, or combinations thereof. Computer-executable instruction or firmware implementations of the processor(s) 138 may include computer-executable or machine-executable instructions written in any suitable programming language to perform the various functions described.

The memory 136 may store program instructions that are loadable and executable on the processor(s) 138, as well as data generated during the execution of these programs. Depending on the configuration and type of service provider computers 106, the memory 136 may be volatile (such as random access memory (RAM)) and/or non-volatile (such as read-only memory (ROM), flash memory, etc.). The service provider computers 106 or servers may also include additional storage 140, which may include removable storage and/or non-removable storage. The additional storage 140 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 136 may include multiple different types of memory, such as static random access memory (SRAM), dynamic random access memory (DRAM), or ROM.

The memory 136, the additional storage 140, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 136 and the additional storage 140 are all examples of computer storage media.

The service provider computers 106 may also contain communications connection(s) 142 that allow the identity interface computers 120 to communicate with a stored database, another computing device or server, user terminals, and/or other devices on the networks 108. The service provider computers 106 may also include input/output (I/O) device(s) 144, such as a keyboard, a mouse, a pen, a voice input device, a touch input device, a display, one or more speakers, a printer, etc.

Turning to the contents of the memory 136 in more detail, the memory 136 may include an operating system 146 and one or more application programs or services for implementing the features disclosed herein including at least a state-classification module 148 and a scale-out module 150. As used herein, modules may refer to programming modules executed by servers or clusters of servers that are part of a service. In this particular context, the modules may be executed by the servers or clusters of servers that are part of the service provider computers 106.

2 Approaches for Achieving Scalability in CEP

When a CEP application is deployed on a cluster group (a cluster group is a group of machines within a CEP cluster that are grouped together. In some cases, the entire cluster representing one group is treated together), it gets deployed on all the machines/nodes that are part of that group. So if there are 'n' nodes in the cluster, there will be 'n' deployments of the same application, one on each node. The central idea in being scalable is to divide the input event data stream into 'n' sub-streams each of which will then be processed by one of these 'n' CEP nodes that have a copy of the application deployed on them and this processing will happen in parallel.

It is important that the distribution mechanism used for distributing messages is efficient, otherwise the overhead for distribution will hamper performance and the CEP nodes will remain under-utilized. In one example, Apache Kafka may be utilized as a message bus, which can be a very efficient way to communicate messages. Apache Kafka, or any other message bus, is a distributed, fault-tolerant and efficient messaging system. While dividing the input events across nodes, there are two strategies: Load-balancing and Partitioning. Load-balancing will ensure that approximately equal events are sent on each CEP node while partitioning will ensure that all events having the same value for the partitioning attribute will go on the same CEP node. These two strategies aim to distribute data into different nodes in CEP clusters. Besides distribution, there is another desirable functionality which is to converge/gather back the entire data on one machine (otherwise known as "fan-in" or "fanning-in").

2.1 New Types of Channels

A channel in the EPN maps to a stream in CQL. Thus, to enhance the channel component in the EPN, a distribution/convergence capacity can be added to it. The channel was annotated with an additional property called 'is-distributed-partitioner' which indicates whether this channel should have the distribution capacity. This channel can be called a Distributed Processing Channel (DPC) (or, in some cases, a Distributed Partitioning Channel). Currently there is a property called max-threads and this can be reused to indicate the number of buckets/partitions/sub-streams into which the incoming stream represented by the channel should be partitioned. In future, instead of using max-threads, a new property dedicated for this purpose may be added, with a clearer name (e.g. numPartitions) into the channel configuration. Based on the discussion above, following types of channels have been introduced in CEP, each of which falls in the category of DPC:

1. Partitioned Channel: max-threads >1 and partitioning property is provided. Partitioning property is an attribute present in the event-type associated with the channel.
2. Load-balancing Channel: max-threads >1 and no partitioning property specified.
3. Fan-in Channel: max-threads=1 (partitioning property if specified is ignored).

When a user configures a channel to be any of the three above (and 'is-distributed-partitioner' is also set to TRUE) then internally a CQL Processor creates a partition stream in CQL. It hands over the necessary metadata e.g. partitioning property specified in the channel configuration to the CQL engine as a part of partition stream creation DDL. Due to this, the CQL engine is able to correctly semantically validate the queries against such a partition stream.

2.2 Utilizing a Message Bus for DPC Implementation

Now that channel is entrusted with the responsibility of distributing/converging the data, it is natural to associate a channel with a message bus (e.g., Apache Kafka or any other message bus). So, one message bus topic may be associated with each DPC in the CEP application. The name of the message bus topic may be something like 'applicationName_channelName', to ensure uniqueness across applications. This topic is created dynamically by CEP when the application is being deployed. Only one of the CEP nodes will succeed in creation of the topic and the rest will get a warning saying topic with this name is already created. This topic is deleted when the application gets un-deployed. These creation and deletion commands require connection with a message bus manager (e.g., Kafka zookeeper) and hence it is also one of the configuration properties in the channel. The message bus manager connection string property may be moved to the CEP server's configuration since it will be same for all DPCs across CEP applications. A message bus topic is divided into partitions and order of events is guaranteed within a partition. One of the brokers/nodes in the message bus cluster is designated as a 'leader' for each partition and the data for that partition is resident on that node and it is also responsible for reads/writes to that partition. There is also a replication of partition data as indicated by the configuration parameter for number of replicas. This value may be set to two (2) so that there is at least one replica of each partition and it will be used when the fault-tolerance and HA problems are tackled. While creating a topic, the number of partitions in that topic can be specified. The value of max-threads parameter may be used as number of partitions. The scalability solution works when the CEP and message bus clusters are running on exactly same set of nodes, in some cases this is required. This may be essential for the consumers of partitions (CEP nodes hosting the CEP application) to be located on the leader for those partitions to avoid network hops and improve performance.

Each DPC internally has two components—a message bus consumer and a message bus producer. The message bus producer will receive incoming data into the channel and insert into the message bus topic by connecting with the message bus broker present on the machine hosting that CEP node. While inserting an event into a partition, if the partitioning attribute is defined in the configuration then the value of that attribute is used as a key and the message bus will determine the appropriate partition for the event based on the key. Otherwise, the event is inserted without a key (load-balancing). Thus the message bus may be relied upon to distribute the incoming stream. While creating consumer component of channel, the locally hosted message bus broker may be asked about the partition metadata. The list of partitions of the topic (associated with that particular channel) for which the local message bus broker is the 'leader' may be determined. Then one dedicated consumer for each of the partitions in that list may be created. This consumer thread reads the event from its partition and sends it to CQL processor downstream for further processing. This strategy ensures that there are no network hops while consuming data from a partition. In the CQL engine, max-threads or numPartitions copies of the query plan are created. The consumer thread is partition aware, meaning the partition id is annotated with the thread and so when it enters the CQL engine there is no re-hashing required based on partitioning criteria. The annotated partition value in the thread ensures that all events in the same message bus partition go to the same copy of query plan in the CQL engine. So if there are multiple message bus partitions hosted on a machine, their processing will happen in parallel on different threads on that machine. At the same time, other nodes are also processing the partitions hosted on them. This is how using the DPC functionality, the CEP stream will be divided into sub-streams and processed in parallel within the CEP cluster.

2.3 Classification of a Query/Exploration

When looking at the scalability problem, it is important to note that not every kind of computation/query is scalable. For example, if some aggregation or pattern match is running on an entire stream, then for correctness purposes, the entire processing may need to be performed on a single machine in a single thread. So what can be scaled and what cannot be scaled is pretty much dependent on the query. So, one goal is to ensure scalability to the maximum possible extent while honoring the semantic correctness of a query. On this note of semantic correctness of a query, consider the different types of queries and the types of stream on which they make sense. As noted, in some cases, SX exploration translates into an EPN in which the processor has only one CQL query. So, even though the type can be associated with a single query, that same type can be associated with the SX exploration containing that query.

A CQL query may be classified into one of the following three types based on the constructs present in that query:
1. Stateless: A query in which operators in the query plan do not maintain any state, so an incoming event can be processed on any node e.g. select * from S where c1>5
2. Semi-Stateful: A query in which operators in the query plan do maintain state but the entire stream is not required to be present on one single node for correct semantics e.g. select c1, sum(c2) from S group by c1
3. Fully-Stateful: A query in which operators in the query plan do maintain state and the entire stream is required to be present on one single node for correct semantics e.g. select sum(c2) from S FIG. 2 shows pseudo-code for determining how to classify a query/exploration into one of the three different types mentioned above. The classification is based on presence of certain clauses in the query Additionally, CQL queries can be divided into three categories based on whether the processing requires computed state based on previous inputs:
i) Stateless Queries (e.g. SELECT * FROM StockStream WHERE symbol='ORCL')
ii) Semi-stateful Queries (e.g. SELECT avg(price),symbol FROM StockStream GROUP BY symbol)
iii) Fully-stateful Queries (e.g. SELECT count(*) FROM StockStream)

Scale-out of the execution of stateless and semi-stateful queries can be done by partitioning the data and processing sub-streams onto various nodes of a CEP Cluster. The degree of parallelism can be decided on the basis of the number of partitions a stream is divided into. But for fully stateful queries, the computation of query output requires the complete stream to be processed by one node. Fully-stateful queries usually have one or more functions which require the complete dataset to provide its output.

For each scenario in the pseudo code of FIG. 2, there exists a function which requires the complete state to compute its output. It has to be noted that not every fully stateful query can be scaled out. For example if a user has specified complex pattern matching in the query, then it cannot be decomposed/rewritten for scalability. Each function can require different handling to compute it in distributed way. In this disclosure, case-3 in above pseudo code will be discussed, i.e. computation of aggregation function where no group by is specified.

In some examples, a continuous query is a graph of continuously running query operators. And, every operator represents some functionality. So, as an example, when a query is written to perform a filter operation, the query is filtering some values of the incoming stream data. As such, "filter" is one of the query operators. In other examples, "join" may be a continuous operator if two streams are to be joined. And, if a window is being created over a stream, then "window" becomes a query operator. Additionally, every operator has their own requirements in terms of the state (e.g., maintained in the memory).

Considering the "window" operator, if it is specified that a window is to be run to identify data received within the last ten minutes (or some time period), and possibly perform an operation. In this scenario, the continuous query can receive the data from an input stream, and maintain the last ten minutes of data in memory. This becomes the state of the operator. Some queries may require some state to be maintained in memory, while other queries may not. For example, some queries may just receive the data and pass it on (e.g., provide it for presentation) or perform an operation on it and then pass it on. In another example, a stateless operator may receive an event, check a filter, and either pass or fail the event.

As noted, there can be three categories of state for continuous query operators. Stateless operators are those that don't require any state to be stored in memory. Semi-stateful queries are those where the state is not completely present in two single data structures. So, it can be partitioned onto multiple data structures, multiple virtual machines (e.g., JVMs) or multiple nodes. For example, suppose it is desired to compute an aggregate (e.g., the sum of received values), by grouping on the basis of symbol (e.g., stock ticker symbols). For every symbol, there may be multiple states, where each state will accumulate the aggregate value for that particular symbol. So, semi-stateful queries are those where the state can be broken on the basis of their partition, and can be saved into multiple virtual machines or multiple nodes. Such queries have characteristics that allow them to be processed in parallel because every partition can maintain state for or store the complete state in itself. In other words, all of the ordering requirements of the operator/query are required at each particular partition. Across the partitions, the ordering does not need to be known.

Fully stateful queries are those that require the maintenance of the state at a single data structure and/or a single node. So, everything must come to a single node to define the state. One example is a "row window" operator (e.g., row 5). For defining this, the query will need to know the last five rows of the stream. Thus, if a single node is maintaining the last five events, the events should all be directed to that node in order to perform the "row window" operation. Another example is "group aggregate" where the "group by" is not specified (e.g., using "count *"). For example, if it is desired to count every single event. For this, every event of the stream needs to be directed to the same operator.

In some examples, if a query is stateless, the query can be scaled out without any problems. For example, the state does not need to be maintained. If a node fails, another node can be added and the next node can easily process the data. Thus, stateless operators are perfectly scalable. Similarly, semi-stateful queries are also scalable. However, in this case, there may be a constraint on the scalability. For example, the amount of scalability may be defined by the number of partitions. Suppose that there are 1000 stock symbols, and it is desired to partition the state by stock symbol, the query may then be partitioned into 1000 sub-states, and each sub-state can maintain the aggregate for each particular symbol. Each symbol can be processed independently. However, for fully-stateful queries, this cannot be done, and the degree of parallelism is one (1) because every event should come to the same operator or node where the query is running to compute the global aggregate.

The three categories of state can be determined automatically by the use of one or more algorithms executed on the query operators. In some examples, it can be determined whether a query is fully stateful. First, the query may be analyzed to determine whether the query has a window construct and if so, whether the window type is "RowWindow," "ValueWindow," or "ValueRelationWindow." If any of these conditions are met, the query can be categorized as fully stateful. Additionally, they query may also be analyzed to determine whether it has a pattern clause and, if so, whether the pattern clause does not have a partition by sub-clause. If so, the query can be categorized as fully stateful. Further, the query can be analyzed to determine whether it has an aggregation function in the select clause and, if so, whether there is no "group by" clause. If so, the query can also be categorized as fully stateful. However, if there is a "group by" clause in the aggregation function, the query may not be categorized as fully stateful, but may instead be semi-stateful.

In some examples, it can be determined whether a query is semi-stateful. First, the query may be analyzed to determine whether the query has a window construct and, if so, whether the window type is "PartitionWindow." If so, the query can be categorized as semi-stateful. Additionally, the query may also be analyzed to determine whether the query has a pattern clause and, if so, whether the pattern clause has a partition by sub-clause. If so, the query can be categorized as semi-stateful. Further, the query can be analyzed to determine whether it has an aggregation function in the select clause and, if so, whether a "group by" clause is present. If so, the query may be categorized as semi-stateful. Alternatively, if the query is not semi-stateful, it may also be categorized as fully stateful by determining whether the query has a Distinct clause, an Order By clause, or a RangeWindow. In any of these cases, the query will be categorized as fully-stateful.

In some examples, if a query is determined to be fully stateful, it may still be scaled out. However, the fully stateful query may first need to be rewritten. Using a query rewrite algorithm, the fully stateful query may be divided, such that the aggregation function of the query is divided into two sets of aggregation functions. One of the two aggregation functions can be run in parallel, while the other must be run on a single node. For example, this can work well with both "global count" and "sum" queries. For "count," different nodes can add up different counts for separate partitions, and then those nodes can be fanned in to a single node that combines all the aggregate count totals to a global count. Similarly, for "sum," parallel processing of different summations for different partitions can be calculated, and then after a fan in, the separate sums can be added to a total sum. This can also work for other functions, e.g., "max," and other incremental functions. By using this strategy, the computational strategy for some fully stateful queries can be divided. In this way, a partial function in combination with a global function can be used scale out even fully stateful queries.

2.4 Validations for DPC-Based CQL Query

Not all types of queries can be run on a given type of DPC (load-balanced or partitioned or fan-in). As discussed earlier, there are two interfaces to CEP—JDeveloper/Eclipse based plugin and SX. When using JDeveloper/Eclipse based plugin, the type of channel the user will create in the EPN cannot be controlled, and so validations in the CQL engine have been added to ensure that the query registered against the user created channel is semantically meaningful. Following are the validations performed on a CQL query:

1. Any CQL query can refer to maximum one partition stream (note that partition stream is created when channel in the EPN is a DPC).
2. If the DPC is partitioned, then:
   a. If query uses row window, value window then an error is raised.
   b. If query uses partition window then ensure that partition by attributes of the window are compatible with partitioning criteria of the stream. If not, error is raised.
   c. If query has a pattern clause without partition by clause then error is raised. Otherwise it is checked whether the partition by attributes are compatible with partitioning criteria of the stream. If not, an error is raised.
   d. If query has an aggregation without group by clause then error is raised. If group by clause is present then it is checked that these attributes are compatible with the partitioning criteria of the stream. If not, an error is raised.

e. By compatibility we mean that the attributes in the clause should be either a permutation of stream's partitioning criteria or stream's partitioning criteria should be a prefix of the attributes in the clause.

f. If query uses a join then only allowed construct is a join with an external relation that uses NOW window over the partitioned stream. If attempt to join with other stream or by using other window on top of partition stream is done then an error will be raised.

3. If the DPC is load-balanced, then an error is raised if:
   a. Query has any type of window.
   b. Query has a pattern clause.
   c. Query has an aggregation function or a group by clause.
   d. Query has a join with a source other than external relation.

2.5 Channel Selection Approach for SX

When using SX, the EPN generation is handled by it, and so SX will need to use pseudo-code similar to FIG. 2 to determine the exploration type. Besides the exploration type, SX will need to receive user input on certain properties required for partitioning. Partitioning criteria for a stream and the number of partitions (numPartitions) are two such properties using which user will specify the scalability needs. Once the exploration type is determined, based on the specified scalability needs of the exploration (e.g. numPartitions and partitioning hint that will be specified by user in the UI etc.) and whether it is being deployed on a cluster group, SX can generate a correct channel in the EPN using. An assumption in this table is that the output channel in each exploration is a regular pass-through (max-size=0, max-threads=0) channel.

In some examples, the below table can be used to enable automatic generation of stream channels by generating an event processing application. The table defines a set of rules that can be used by a stream explorer (e.g., SX), but not necessarily by the event processing application. However, the SX can generate an event processing application based on the rules, and the application can have various different kinds/types of channels based on the query and the rules. Thus, the SX can generate an EPN using the rules of the table.

SX allows for the design of explorations. And, each exploration is one EPN, which is the same as one event processing application. So, the system can have multiple event processing applications running in parallel. A user may be able to select a source of the data, where the data is coming from, and a set of aggregate functions. The SX will then generate an adapter, the appropriate query, and an output. However, using the below table, the explorations can be combined or chained to generate event processing applications for a particular chain of explorations. The set of rules can define how the explorations are connected for the applications.

In some cases, a single exploration generates a single application having a single CQL query. According to the below rules, the exploration can be defined for the application. If a query is stateful, then the exploration will be stateful. Thus, the type of exploration can be data mined from the query itself. Following the table of rules below, combinations of the chains of explorations can be determined.

As an example, using the below table, if the source of data is a stream, and the query is stateless (e.g., combination #1), a load balancer channel can be used to distribute the processing of the stateless query to multiple nodes. In this case, an adapter can be used to receive the data, then a load balancing channel can be implemented, following by a processor to process the query, and an output channel. The processor will have the query, which in this case is stateless, and each node can implement a separate instance of the stateless query.

As a different example, using the table below, if the source of data is a stateless query, and next query is also stateless (e.g., combination #2), a regular CEP pass-through cannel can be used. Here, the execution can proceed in the same thread (e.g., coming from the parent node) across the exploration because there is no need to repartition the data. In other words, the data is already fanned out, so there is no need to fan out the data again. Combination #3 is semi-stateful to stateless. Thus, although there is partition criteria for the semi-stateful data, there is no need to repartition the data when going to a stateless query next. Since all the states are kept at each node already, they can proceed accordingly. Thus, the regular pass-through channel can be used here. When going from fully-stateful to stateless (e.g., combination #4), the load balancing channel can be used. Because there is no requirement for the stateless operation, the data can be fanned out, similar to in combination #1. In examples where the next appropriate channel is "Partitioned" (e.g., combinations #5-8), the data may already be fanned out to multiple nodes. However, because the next query will likely be semi-stateful (which requires fanning according to partitioning criteria), the fanned out channels will need to be reorganized to a different set of distributed nodes. That is, the processing will stay distributed, and run in parallel; however, the new set of distributed nodes will be based on the partitioning criteria of the semi-stateful query operator. So, the data will be re-distributed. For combinations #9-11, the downstream queries are fully stateful, so the data (which is already fanned out due to the parent node) will need be brought back to a single node. Thus, a fan-in channel will need to be used.

Continuing through the table, it can be seen that many different combinations are defined, and the rules can be used to generate any set of explorations. These rules apply to data mining the characteristics of each exploration. After that, on the basis of these explorations and the parent exploration, the next type of channel and/or application can be determined and implemented.

| Sr. No. | Combination Parent Exploration → Dependent Exploration | Type of first (input) Channel of dependent exploration | Shuffling of events needed across explorations? | numPartitions value of parent and dependent exploration same? | Comments |
|---|---|---|---|---|---|
| 1 | Stream →Stateless | Load-balancing DPC | Yes | NA | Load-balancing channel with user specified numPartitions will allow better utilization of CEP cluster nodes. |

-continued

| Sr. No. | Combination Parent Exploration → Dependent Exploration | Type of first (input) Channel of dependent exploration | Shuffling of events needed across explorations? | numPartitions value of parent and dependent exploration same? | Comments |
|---|---|---|---|---|---|
| 2 | Stateless → Stateless | Regular CEP Pass-through Channel (max-threads = 0, max-size = 0) | No | Yes | a. Execution can proceed in the same thread (coming from parent) across explorations. No need to shuffle events across nodes. b. numPartitions of new exploration can be ignored. |
| 3 | Semi-Stateful → Stateless | Regular CEP Pass-through Channel (max-threads = 0, max-size = 0) | No | Yes | Same as (2). |
| 4 | Fully-Stateful → Stateless | Load-balancing DPC | Yes | Not necessary | Fully-stateful parent exploration will produce output in one thread on a single node. Dependent Stateless exploration can however distribute those events across nodes. |
| 5 | Stream → Semi-Stateful | Partitioned DPC | Yes | NA | SX should take a partitioning attribute and numPartitions for the stream from the user. Based on user's selections, partitioning hint (group by attribute if grouping is specified etc.) can be given. |
| 6 | Stateless → Semi-Stateful | Partitioned DPC | Yes | Not necessary | Same as (5). |
| 7 | Semi-Stateful → Semi-Stateful | Partitioned DPC | Yes | Not necessary | a. Two semi-stateful explorations can be using a different partitioning criterion and can have different DOP expectations so shuffling is needed. b. Later on, we might add optimization to use regular pass-through CEP channel instead of Partitioned DPC, if the partition criterion and numPartitions is same for parent and dependent exploration. c. Rest is same as (5). |
| 8 | Fully-Stateful → Semi-Stateful | Partitioned DPC | Yes | Not necessary | Same as (5) |
| 9 | Stream → Fully-Stateful | Fan-in DPC or Regular CEP buffered Channel (max-size >0) | Depends on input | NA | a. If events are being received at more than one node in a cluster then we need to have Fan-in DPC to get a fan-in behavior prior to running a fully stateful exploration. b. Consumer for the fan-in channel's Kafka partition could technically be located on any node but we can safely assume it to be running on a primary node. c. If data is already being received on only one node then there is an uncertainty. Can we assume it will always be a primary node? Need to decide on this assumption. If that is the case, we can make use of regular CEP buffered channel and no shuffling is needed otherwise default would be to create a fan-in DPC. |

-continued

| Sr. No. | Combination Parent Exploration → Dependent Exploration | Type of first (input) Channel of dependent exploration | Shuffling of events needed across explorations? | numPartitions value of parent and dependent exploration same? | Comments |
|---|---|---|---|---|---|
| 10 | Stateless → Fully-Stateful | Fan-in DPC | Yes | Not necessary | a. Multiple nodes might be processing the parent stateless exploration and all that data needs to be converged to one node. b. The consumer for the topic associated with the Fan-in channel could be located on the primary. |
| 11 | Semi-Stateful → Fully-Stateful | Fan-in DPC | Yes | Not necessary | Same as (10). |

3 Illustrative Example

In one non-limiting example, a CEP application named StockApplication may take a StockEvent<Symbol char(20), Price Double> as input and compute aggregations like count on top of the incoming stream (StockStream), grouping by Symbol. So the CQL query in the processor would look like:
    select Symbol, count(*) from StockStream group by Symbol Note that this query could be part of an EPN generated by SX or EPN generated using JDeveloper/Eclipse plug-in. If the EPN is generated by SX, then SX would have asked user's input on numPartitions and partitioning criteria when the streaming source was created. Assuming that the user's input for these two properties was 5 and 'Symbol', respectively, SX would analyze the query using algorithmic flow specified in FIG. 2, and determine that this exploration is Semi-Stateful exploration on top of a stream. Assuming SX knows the deployment is going to happen on a cluster group, using the above table, it can determine that the channel to be created in this case is Partitioned DPC. So the channel configuration in the generated EPN would look like:

```
<wlevs : channel id = "StockStream"
    event-type = "StockEvent"
    is-distributed-partitioner = "true"
    max-threads = "5"
    zookeeper-servers = "<zookeeper-conn-string>">
    <wlevs : instance-property
    name = "partitionByEventProperty" value = "Symbol"/>
    <wlevs : listener ref = "StockProcessor" />
</wlevs : channel>
```

Note how the numPartitions value gets translated into max-threads parameter value and the partitioning criteria is used in partitionByEventProperty. The zookeeper-conn-string is in host:port format where host is the machine on which message bus manager is running and port is the port on which it is listening. As explained earlier, the names and placements of these parameters in the configuration files of CEP can change.

If the EPN is being created by using JDeveloper/Eclipse plug-in then user will need to create similar configuration for channel as shown above. If the user does not create such a configuration then CQL validations when application is deployed will catch the errors. For example, if user does not specify the partitionByEventProperty in the above configuration, then internally CQL engine will treat this as a Load-balanced DPC and on this type of DPC such a query is not valid as per validations.

Figure 3:
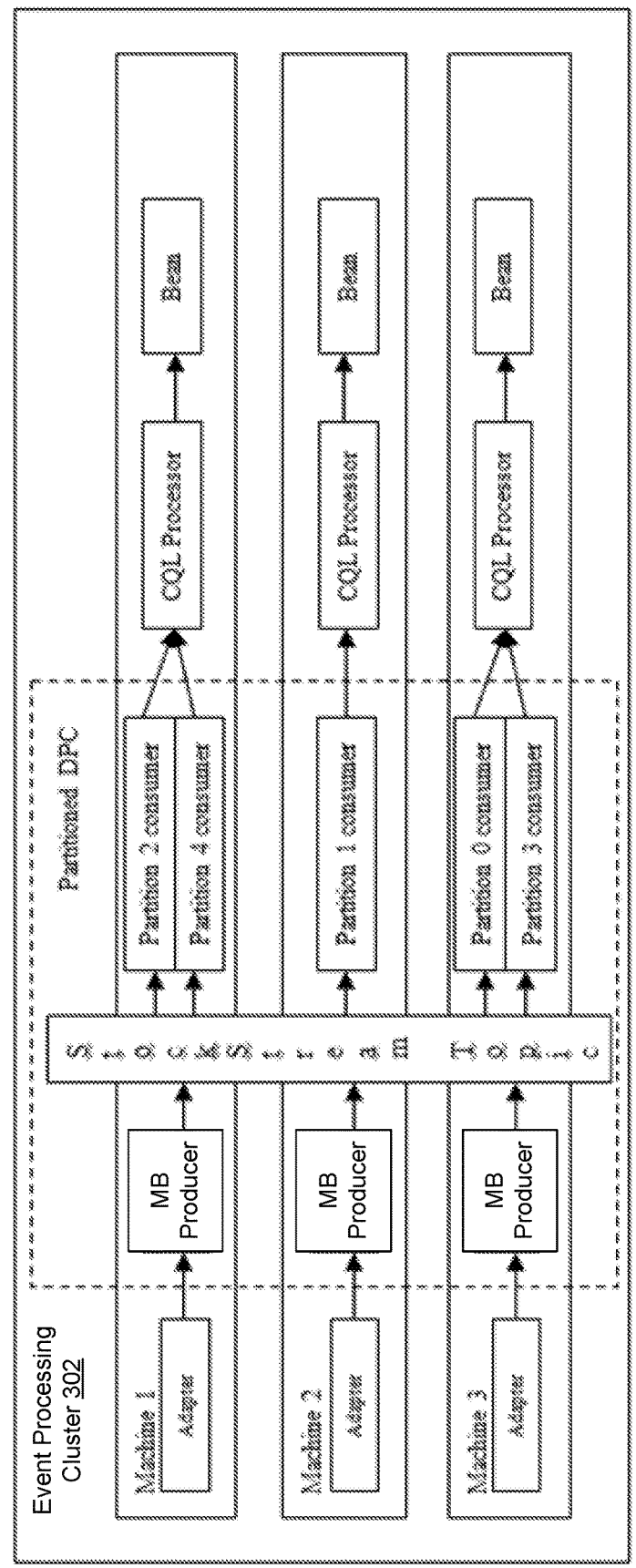
FIG. 3 is a simplified block diagram of details for implementing an embodiment of the present disclosure.

FIG. 3 illustrates one example 300 of a set of machines in a processing cluster 302. Assuming that the following cluster of machines are available (e.g., Machine 1, Machine 2, and Machine 3), and CEP servers are running as a part of CEP cluster on each machine, and message bus brokers are also running on the same set of machines in a cluster. Now when this application is deployed on this CEP cluster of these three machines, it will get deployed on each of the CEP servers. Since a partitioned DPC is being used, each CEP server will try to create a topic with the name StockApplication_StockStream after connecting to the message bus using the provided zookeeper-servers. Only one of these (whichever goes first) will succeed and the rest will get a warning since topic will already be created. The created topic would have 5 partitions since max-threads/numPartitions is specified as 5. On every node, a message bus Producer instance is created which can send events to this message us topic using the message bus Broker running locally. Before creating message bus consumer instances, every node will consult topic metadata with the locally running broker. Let us assume that the metadata returned shows five partitions and their leaders as follows: Machine 1—Partitions 2 and 4, Machine 2—Partition 1, and Machine 3—Partitions 0 and 3.

Now, one message bus consumer will be created for each of the partitions hosted on a machine. So Machine 2 will create a consumer for the Partition 1 since it is a leader for that partition and Machine 3 will create a consumer each for Partition 0 and 3 since it is a leader for that partition and similarly for Machine 1. Thus a consumer is created only for the locally hosted partition for which that machine is the leader. All this processing will happen at application deployment time.

The threads reading partitions on each machine continue execution into CQL processor and then CQL engine. The CQLEngine on each machine has max-threads copies of the query plan. The consumer thread has partition associated with it and it ensures all events read from a message bus partition are processed by same copy of the query plan.

Once the DPC is setup this way and the application starts running, the incoming events will be inserted into the message bus using message bus Producer instances and while inserting the events 'Symbol' value would be specified as partition key. Then the message bus will internally partition the data using the specified key and assign it to appropriate partition. All events with same value for the key (here Symbol) will go to the same node. The consumers would then read the events from a partition and carry execution into the CQL engine. Thus the input StockStream gets distributed across machines using Kafka and the processing across CEP nodes can happen in parallel. Since Kafka is efficient in distribution, the overhead is not that much and we can achieve near linear scalability as CEP node potential is fully utilized.

3 Scale-Out Computation of Group Aggregate without Group by Attributes

To scale out computation of such group aggregate functions, a group aggregate function can be defined as a composite function of two functions where inner function can be computed on a partitioned stream and outer function requires a complete stream. In some sense, it is equivalent to the map-reduce paradigm, where inner function maps and compute local result and reducer will combine all local results into a global result value.

e.g. count(*) is a function which requires a global count of events of incoming stream.

Figure 4:
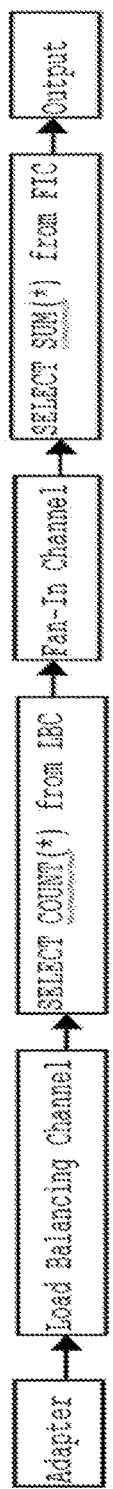
FIG. 4 is a simplified block diagram of details for implementing an embodiment of the present disclosure.

In some cases, count(*) may be rewritten in the form of a composite function (e.g., count=$sum_{global}(count_{partial})$). In this case, we can compute partial counts on all nodes of a cluster and then compute the global count on a reducer node by adding all partial counts. To generalize this approach, aggregate functions may be defined in the following form: $F=F_{global}(F_{partial})$. Additionally, FIG. 4 is an example 400 of how the aggregate function may be implemented.

In above EPN, the partial count may be computed in a first CQL Processor and then the global count may be computed in second CQL processor. The load-balancing channel achieves the division of incoming stream into multiple sub-streams and 'count(*)' gets computed on them in parallel. The fan-in channel helps in converging the partial counts onto a single node/machine and then these are summed to get the final count.

On the same lines, a partial aggregate and a global aggregate function can be defined for each built-in function supported by CQL. The following is a list of some built-in aggregate functions which can be expressed in this manner.

| Aggregation function | Partial aggregator | Global aggregator |
| --- | --- | --- |
| Count | count | Sum |
| Sum | sum | Sum |
| Max | max | Max |
| min | min | Min |
| avg | sum, count | avg(sum(sum), sum(count)) |
| Median | median | median of median |

For built-in functions, two queries can be generated internally, one for partial aggregate and another for global aggregates. To handle user defined aggregates on the similar lines, a unified architecture to handle both UDAs as well as built-in aggregates may be generated. This architecture should let users define an aggregate as a composite function having a partial aggregator and a global aggregator.

As noted, for fully-stateful data, all the data should be brought back to the same virtual machine or operator instance, so state can be maintained (e.g., an in-memory data structure). However, this can be a source of contention when a query is to be scaled out. In some scenarios, a fully stateful query can be decomposed into two parts. The construct that makes the query fully stateful can be divided into two parts, where one part can be able to run the query on a parallel node (multiple nodes) and the second part can combine the results back onto the single node. Thus, any function that makes a query fully stateful can be defined as a function of functions, where the inner function computes the partial computations of the function. For an aggregate function, the inner function would act as a partial aggregate function and compute the partial result value in a scale-out fashion and the outer function is a global function that will combine the partial results back and create the final state of the particular function.

In one example, the "count(*)" operator may instruct a query to count the total number of event of an input stream. This may require all the data to be processed on a single node. So, in order to scale out this query, the count(*) can be expressed using two functions (e.g., a composite function). Thus, one way to implement the count(*) function as a composite function would be to form two functions, one that counts each event, and a second that sums up all the different counts (e.g., at different nodes). In this example, the sum is the outer function and the count is the inner function (e.g., performing the partial computation). In this way, the count function can be scaled out to multiple different nodes within a cluster of virtual machines (nodes) to compute the partial counts at each node. The different nodes may run different count functions in parallel. Once the partial function results are obtained at each node, they can be supplied back to the execution operator (e.g., the continuous query operator that represents the global function—here, the "sum" function). Here, the results are all joined back to that "sum" node and the result will be the "count(*)" value on top of the stream.

In some examples, once a user writes a continuous query (e.g., using "count(*)"), the stream explorer will be configured to divide that query into two queries (first, the partial query and second, the global query). The partial query should be a semi-stateful query which can be run on the parallel node in the scale-out manner and process incoming data streams in the partitions. The second query (the global query) will become a fully stateful query which will combine all the results from the partial queries. This process is done to scale out the query and to optimize (increase) the throughput of the cluster and the utilization of the query. Without the above functionality, if there is a fully stateful query being used, only one node can be utilized to compute the result. But, by dividing the query, multiple nodes can be used, and the cluster can be utilized to compute the partial results and pass the results back to a single node.

The techniques described above and below may be implemented in a number of ways and in a number of contexts. Several example implementations and contexts are provided with reference to the following figures, as described below in more detail. However, the following implementations and contexts are but a few of many.

Figure 5:
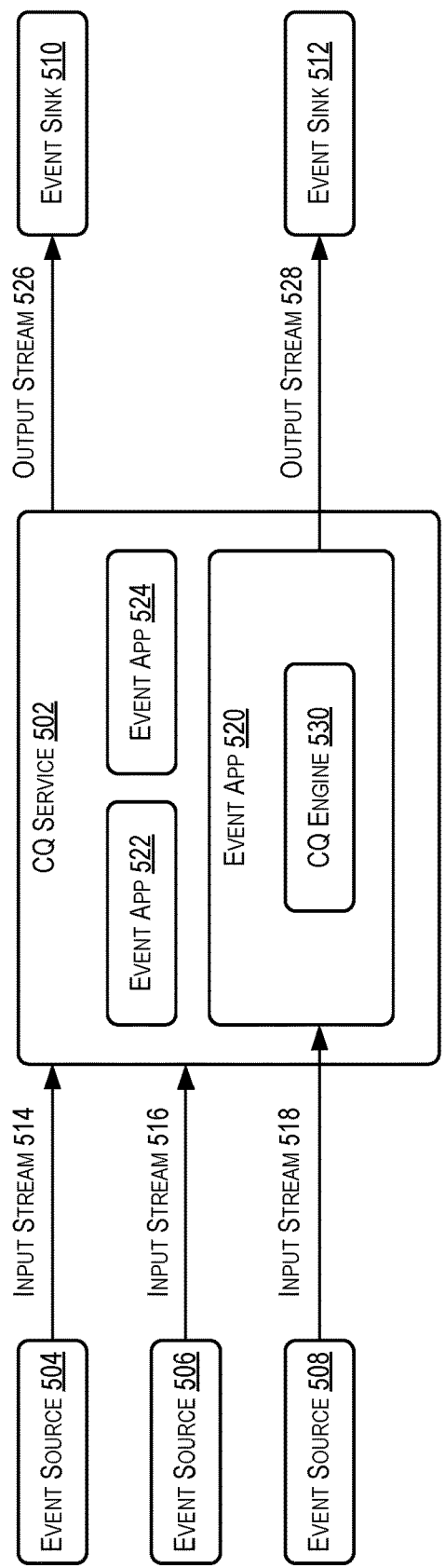
FIG. 5 is a simplified block diagram of complex event processing system according to an embodiment of the present disclosure.

FIG. 5 depicts a simplified high level diagram of an event processing system 500 that may incorporate an embodiment of the present disclosure. Event processing system 500 may comprise one or more event sources (204, 506, 508), an event processing server (EPS) 502 (also referred to as CQ Service 502) that is configured to provide an environment for processing event streams, and one or more event sinks (210, 512). The event sources generate event streams that are received by EPS 502. EPS 502 may receive one or more event streams from one or more event sources. For example, as shown in FIG. 5, EPS 502 receives an input event stream 514 from event source 504, a second input event stream 516 from event source 506, and a third event stream 518 from event source 508. One or more event processing applications (220, 522, and 524) may be deployed on and be executed by EPS 502. An event processing application executed by EPS 502 may be configured to listen to one or more input event streams, process the events received via the one or more event streams based upon processing logic that selects one or more events from the input event streams as notable events. The notable events may then be sent to one or more event sinks (210, 512) in the form of one or more output event streams. For example, in FIG. 5, EPS 502 outputs an output event stream 526 to event sink 510, and a second output event stream 528 to event sink 512. In certain embodiments, event sources, event processing applications, and event sinks are decoupled from each other such that one can add or remove any of these components without causing changes to the other components.

In one embodiment, EPS 502 may be implemented as a Java server comprising a lightweight Java application container, such as one based upon Equinox OSGi, with shared services. In some embodiments, EPS 502 may support ultra-high throughput and microsecond latency for processing events, for example, by using JRockit Real Time. EPS 502 may also provide a development platform (e.g., a complete real time end-to-end Java Event-Driven Architecture (EDA) development platform) including tools (e.g., Oracle CEP Visualizer and Oracle CEP IDE) for developing event processing applications.

An event processing application is configured to listen to one or more input event streams, execute logic (e.g., a query) for selecting one or more notable events from the one or more input event streams, and output the selected notable events to one or more event sources via one or more output event streams. FIG. 5 provides a drilldown for one such event processing application 520. As shown in FIG. 5, event processing application 520 is configured to listen to input event stream 518, execute a query 530 comprising logic for selecting one or more notable events from input event stream 518, and output the selected notable events via output event stream 528 to event sink 512. Examples of event sources include, without limitation, an adapter (e.g., JMS, HTTP, and file), a channel, a processor, a table, a cache, and the like. Examples of event sinks include, without limitation, an adapter (e.g., JMS, HTTP, and file), a channel, a processor, a cache, and the like.

Although event processing application 520 in FIG. 5 is shown as listening to one input stream and outputting selected events via one output stream, this is not intended to be limiting. In alternative embodiments, an event processing application may be configured to listen to multiple input streams received from one or more event sources, select events from the monitored streams, and output the selected events via one or more output event streams to one or more event sinks. The same query can be associated with more than one event sink and with different types of event sinks.

Due to its unbounded nature, the amount of data that is received via an event stream is generally very large. Consequently, it is generally impractical and undesirable to store or archive all the data for querying purposes. The processing of event streams requires processing of the events in real time as the events are received by EPS 502 without having to store all the received events data. Accordingly, EPS 502 provides a special querying mechanism that enables processing of events to be performed as the events are received by EPS 502 without having to store all the received events.

Event-driven applications are rule-driven and these rules may be expressed in the form of continuous queries that are used to process input streams. A continuous query may comprise instructions (e.g., business logic) that identify the processing to be performed for received events including what events are to be selected as notable events and output as results of the query processing. Continuous queries may be persisted to a data store and used for processing input streams of events and generating output streams of events. Continuous queries typically perform filtering and aggregation functions to discover and extract notable events from the input event streams. As a result, the number of outbound events in an output event stream is generally much lower than the number of events in the input event stream from which the events are selected.

Unlike a SQL query that is run once on a finite data set, a continuous query that has been registered by an application with EPS 502 for a particular event stream may be executed each time that an event is received in that event stream. As part of the continuous query execution, EPS 502 evaluates the received event based upon instructions specified by the continuous query to determine whether one or more events are to be selected as notable events, and output as a result of the continuous query execution.

The continuous query may be programmed using different languages. In certain embodiments, continuous queries may be configured using the CQL provided by Oracle Corporation and used by Oracle's Complex Events Processing (CEP) product offerings. Oracle's CQL is a declarative language that can be used to program queries (referred to as CQL queries) that can be executed against event streams. In certain embodiments, CQL is based upon SQL with added constructs that support processing of streaming events data.

In one embodiment, an event processing application may be composed of the following component types:

(1) One or more adapters that interface directly to the input and output stream and relation sources and sinks. Adapters are configured to understand the input and output stream protocol, and are responsible for converting the event data into a normalized form that can be queried by an application processor. Adapters may forward the normalized event data into channels or output streams and relation sinks. Event adapters may be defined for a variety of data sources and sinks.

(2) One or more channels that act as event processing endpoints. Among other things, channels are responsible for queuing event data until the event processing agent can act upon it.

(2) One or more application processors (or event processing agents) are configured to consume normalized event data from a channel, process it using queries to select notable events, and forward (or copy) the selected notable events to an output channel.

(4) One or more beans are configured to listen to the output channel, and are triggered by the insertion of a new event into the output channel. In some embodiments, this user code is a plain-old-Java-object (POJO). The user application can make use of a set of external services, such as JMS, Web services, and file writers, to forward the generated events to external event sinks.

(5) Event beans may be registered to listen to the output channel, and are triggered by the insertion of a new event into the output channel. In some embodiments, this user code may use the Oracle CEP event bean API so that the bean can be managed by Oracle CEP.

In one embodiment, an event adapter provides event data to an input channel. The input channel is connected to a CQL processor associated with one or more CQL queries that operate on the events offered by the input channel. The CQL processor is connected to an output channel to which query results are written.

In some embodiments, an assembly file may be provided for an event processing application describing the various components of the event processing application, how the components are connected together, event types processed by the application. Separate files may be provided for specifying the continuous query or business logic for selection of events.

It should be appreciated that system 500 depicted in FIG. 5 may have other components than those depicted in FIG. 5. Further, the embodiment shown in FIG. 5 is only one example of a system that may incorporate an embodiment of the present disclosure. In some other embodiments, system 500 may have more or fewer components than shown in FIG. 5, may combine two or more components, or may have a different configuration or arrangement of components. System 500 can be of various types including a personal computer, a portable device (e.g., a mobile telephone or device), a workstation, a network computer, a mainframe, a kiosk, a server, or any other data processing system. In some other embodiments, system 500 may be configured as a distributed system where one or more components of system 500 are distributed across one or more networks in the cloud.

The one or more of the components depicted in FIG. 5 may be implemented in software, in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

Illustrative methods and systems for implementing the hybrid execution of continuous and scheduled queries are described above. Some or all of these systems and methods may, but need not, be implemented at least partially by architectures and processes such as those shown at least in FIGS. 1-5 above.

Figure 6:
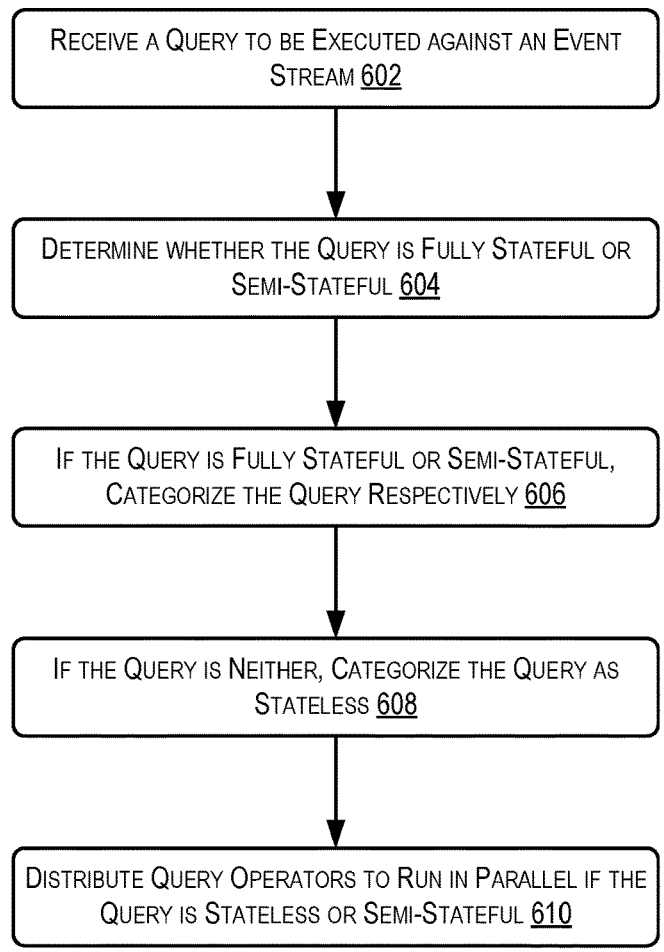
FIG. 6 is a flowchart of a method for implementing an embodiment of the present disclosure.
Figure 7:
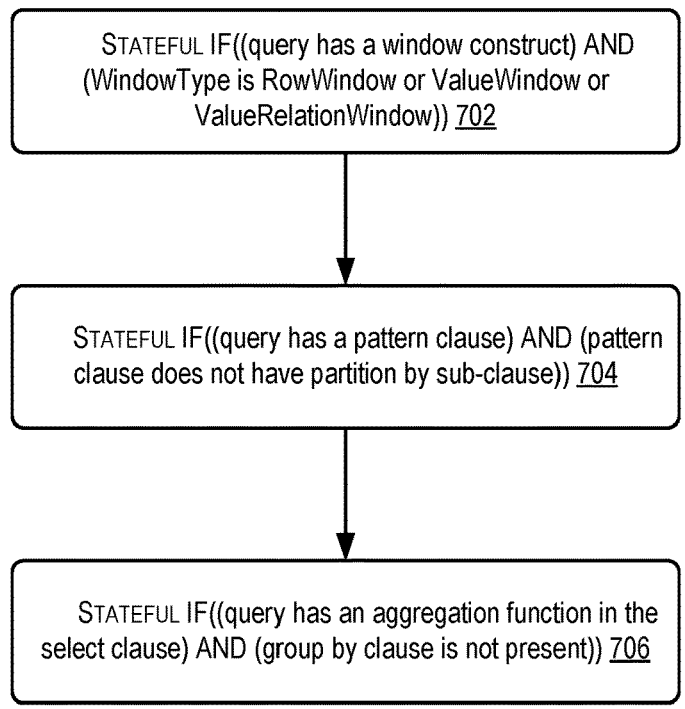
FIG. 7 is a flowchart of a method for implementing an embodiment of the present disclosure.
Figure 8:
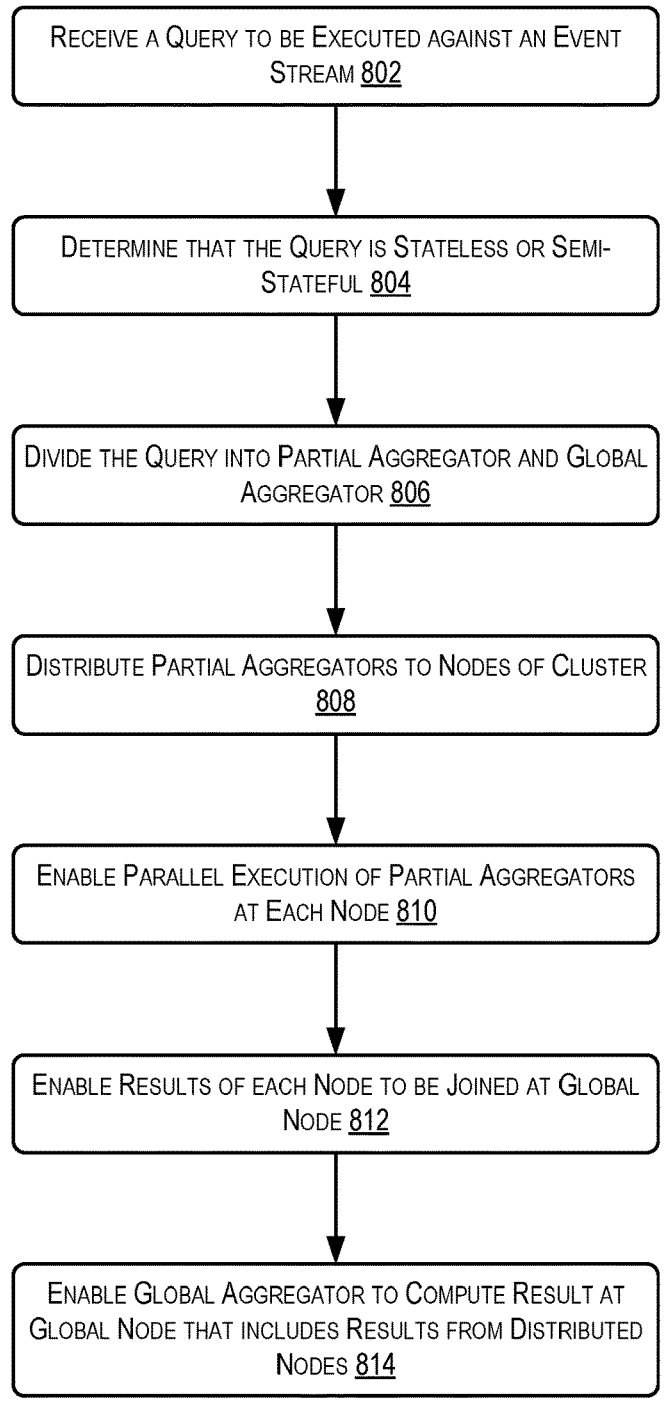
FIG. 8 is a flowchart of a method for implementing an embodiment of the present disclosure.

FIGS. 6-8 are flowcharts of methods 600, 700, and 800, respectively, for scaling continuous query processing in accordance with an embodiment of the present disclosure. Implementations or processing of methods 600, 700, and 800 depicted in FIGS. 6-8 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Each of the steps of any of the processes described herein and below may be performed in any order, may be omitted (or otherwise skipped), may be replaced by other steps, and/or may be performed repeatedly or recursively, as desired.

Method 600 depicted in FIG. 6 may begin at 602 where a query may be received. The query may be configured to be executed against an event stream. At 604, it may be determined whether the query is fully stateful or semi-stateful. At 606, the queries may be categorized based on whether it was determined to be fully stateful or semi-stateful. If neither, the query may be categorized as stateless at 608. At 610, the method 600 may distribute query operators to be run in parallel if the query is classified as stateless or semi-stateful.

FIG. 7 is a flowchart of method 700 for scaling continuous query processing in accordance with an embodiment of the present disclosure. Method 700 depicted in FIG. 7 may begin at 702, where the query may be determined to be stateful if: the query has a window construct and the WindowType is RowWindow, ValueWindow, or ValueRelationWindow. At 704, the method 700 may determine that the query is stateful if: the query has a pattern clause and the pattern clause does not have a "partition by" sub-clause. Further, the method 700 may end at 706, where the method 700 may determine that the query is stateful if: the query has an aggregation function in the select clause and there is no "group by" clause.

FIG. 8 is a flowchart of method 800 for scaling continuous query processing in accordance with an embodiment of the present disclosure. Method 800 depicted in FIG. 8 may begin at 802, where a query to be executed against an event stream may be received. At 804, the method 800 may determine that the query is fully stateful, stateless, or semi-stateful. At 806, the method 800 may divide the query into a partial aggregator and a global aggregator if the query is fully stateful. At 808, the method 800 may distribute the partial aggregators to nodes of a cluster. The method 800 may enable parallel execution of the partial aggregators at each node at 810 and then enable results of each node to be joined at a global node at 812. The method 800 may end at 814, where the method 800 may enable the global aggregator to compute results at a global node that include the results from the distributed nodes.

Figure 9:
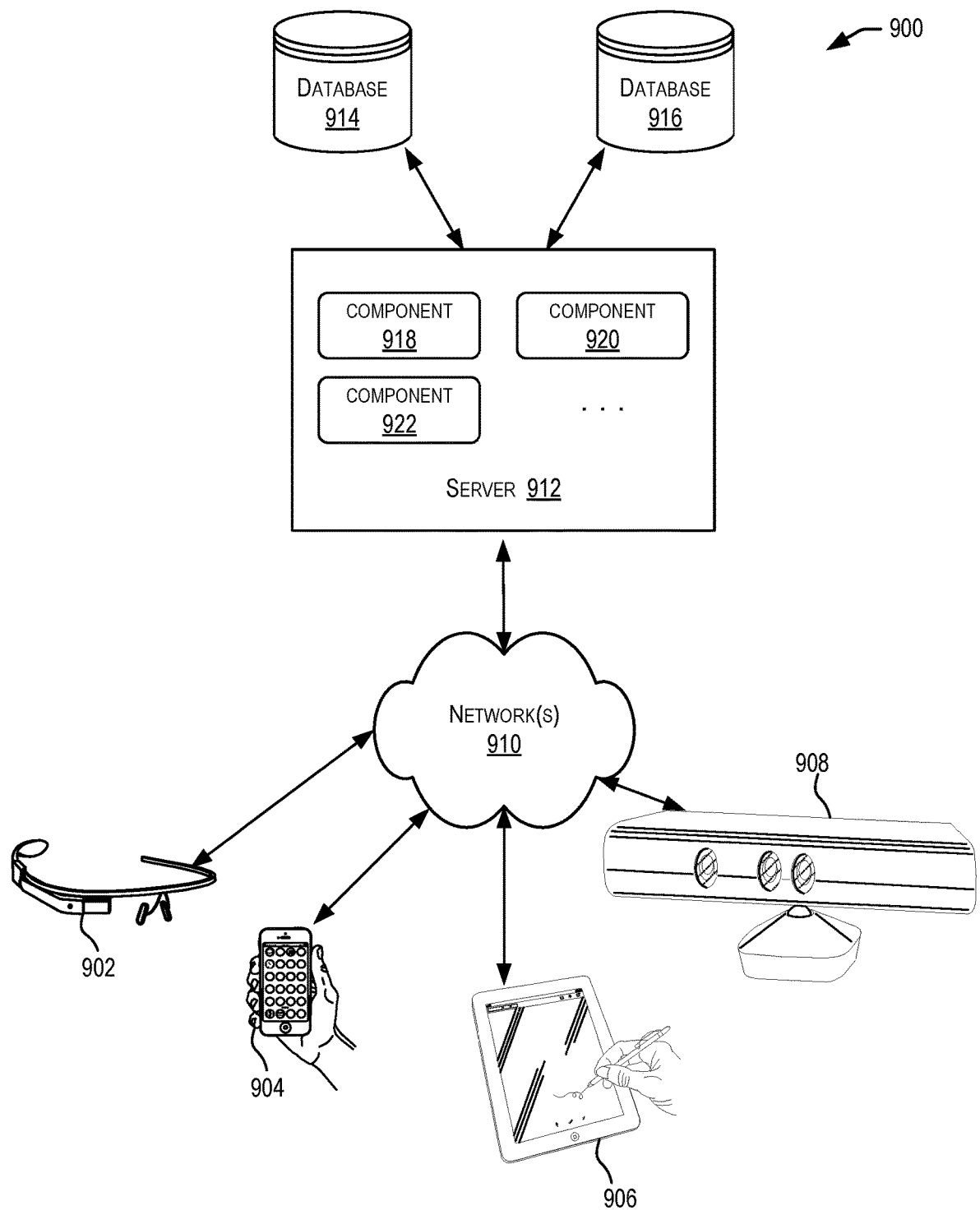
FIG. 9 depicts a simplified diagram of a distributed system for implementing some of the examples described herein, according to at least one example.

FIG. 9 depicts a simplified diagram of a distributed system 900 for implementing one of the embodiments. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various embodiments, server 912 may be adapted to run one or more services or software applications provided by one or more of the components of the system. The services or software applications can include nonvirtual and virtual environments. Virtual environments can include those used for virtual events, tradeshows, simulators, classrooms, shopping exchanges, and enterprises, whether two- or three-dimensional (3D) representations, page-based logical environments, or otherwise. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 902.11 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 912 can include one or more virtual machines running virtual operating systems, or other computing architectures involving virtualization. One or more flexible pools of logical storage devices can be virtualized to maintain virtual storage devices for the server. Virtual networks can be controlled by server 912 using software defined networking. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle, that are adapted to store, update, and retrieve data in response to SQL-formatted commands.

Figure 10:
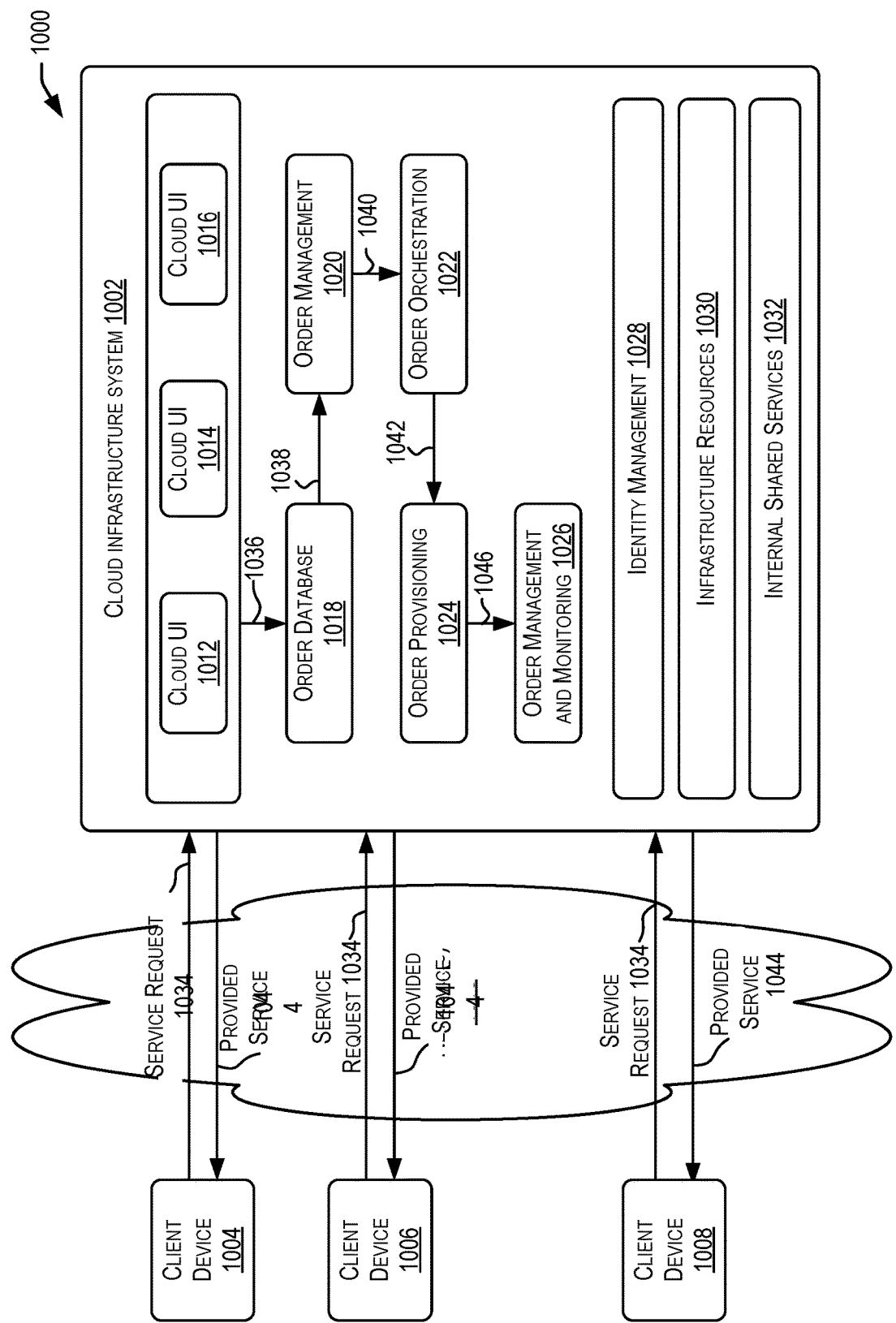
FIG. 10 is a simplified block diagram of components of a system environment by which services provided by the components of an embodiment system may be offered as cloud services, in accordance with some of the examples described herein, according to at least one example.

FIG. 10 is a simplified block diagram of one or more components of a system environment 1000 by which services provided by one or more components of an embodiment system may be offered as cloud services, in accordance with an embodiment of the present disclosure. In the illustrated embodiment, system environment 1000 includes one or more client computing devices 1004, 1006, and 1008 that may be used by users to interact with a cloud infrastructure system 1002 that provides cloud services. The client computing devices may be configured to operate a client application such as a web browser, a proprietary client application (e.g., Oracle Forms), or some other application, which may be used by a user of the client computing device to interact with cloud infrastructure system 1002 to use services provided by cloud infrastructure system 1002.

It should be appreciated that cloud infrastructure system 1002 depicted in the figure may have other components than those depicted. Further, the embodiment shown in the figure is only one example of a cloud infrastructure system that may incorporate an embodiment of the disclosure. In some other embodiments, cloud infrastructure system 1002 may have more or fewer components than shown in the figure, may combine two or more components, or may have a different configuration or arrangement of components.

Client computing devices 1004, 1006, and 1008 may be devices similar to those described above for 902, 904, 906, and 908.

Although exemplary system environment 1000 is shown with three client computing devices, any number of client computing devices may be supported. Other devices such as devices with sensors, etc. may interact with cloud infrastructure system 1002.

Network(s) 1010 may facilitate communications and exchange of data between clients 1004, 1006, and 1008 and cloud infrastructure system 1002. Each network may be any type of network familiar to those skilled in the art that can support data communications using any of a variety of commercially-available protocols, including those described above for network(s) 910.

Cloud infrastructure system 1002 may comprise one or more computers and/or servers that may include those described above for server 912.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1002 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

'Big data' can be hosted and/or manipulated by the infrastructure system on many levels and at different scales. Extremely large data sets can be stored and manipulated by analysts and researchers to visualize large amounts of data, detect trends, and/or otherwise interact with the data. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1002 may be adapted to automatically provision, manage and track a customer's subscription to services offered by cloud infrastructure system 1002. Cloud infrastructure system 1002 may provide the cloud services via different deployment models. For example, services may be provided under a public cloud model in which cloud infrastructure system 1002 is owned by an organization selling cloud services (e.g., owned by Oracle) and the services are made available to the general public or different industry enterprises. As another example, services may be provided under a private cloud model in which cloud infrastructure system 1002 is operated solely for a single organization and may provide services for one or more entities within the organization. The cloud services may also be provided under a community cloud model in which cloud infrastructure system 1002 and the services provided by cloud infrastructure system 1002 are shared by several organizations in a related community. The cloud services may also be provided under a hybrid cloud model, which is a combination of two or more different models.

In some embodiments, the services provided by cloud infrastructure system 1002 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1002. Cloud infrastructure system 1002 then performs processing to provide the services in the customer's subscription order.

In some embodiments, the services provided by cloud infrastructure system 1002 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1002 may also include infrastructure resources 1030 for providing the resources used to provide various services to customers of the cloud infrastructure system. In one embodiment, infrastructure resources 1030 may include pre-integrated and optimized combinations of hardware, such as servers, storage, and networking resources to execute the services provided by the PaaS platform and the SaaS platform.

In some embodiments, resources in cloud infrastructure system 1002 may be shared by multiple users and dynamically re-allocated per demand. Additionally, resources may be allocated to users in different time zones. For example, cloud infrastructure system 1030 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1032 may be provided that are shared by different components or modules of cloud infrastructure system 1002 and by the services provided by cloud infrastructure system 1002. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1002 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1002, and the like.

In one embodiment, as depicted in the figure, cloud management functionality may be provided by one or more modules, such as an order management module 1020, an order orchestration module 1022, an order provisioning module 1024, an order management and monitoring module 1026, and an identity management module 1028. These modules may include or be provided using one or more computers and/or servers, which may be general purpose computers, specialized server computers, server farms, server clusters, or any other appropriate arrangement and/or combination.

In exemplary operation 1034, a customer using a client device, such as client device 1004, 1006 or 1008, may interact with cloud infrastructure system 1002 by requesting one or more services provided by cloud infrastructure system 1002 and placing an order for a subscription for one or more services offered by cloud infrastructure system 1002. In certain embodiments, the customer may access a cloud User Interface (UI), cloud UI 1012, cloud UI 1014 and/or cloud UI 1016 and place a subscription order via these UIs. The order information received by cloud infrastructure system 1002 in response to the customer placing an order may include information identifying the customer and one or more services offered by the cloud infrastructure system 1002 that the customer intends to subscribe to.

After an order has been placed by the customer, the order information is received via the cloud UIs, 1012, 1014 and/or 1016.

At operation 1036, the order is stored in order database 1018. Order database 1018 can be one of several databases operated by cloud infrastructure system 1018 and operated in conjunction with other system elements.

At operation 1038, the order information is forwarded to an order management module 1020. In some instances, order management module 1020 may be configured to perform billing and accounting functions related to the order, such as verifying the order, and upon verification, booking the order.

At operation 1040, information regarding the order is communicated to an order orchestration module 1022. Order orchestration module 1022 may utilize the order information to orchestrate the provisioning of services and resources for the order placed by the customer. In some instances, order orchestration module 1022 may orchestrate the provisioning of resources to support the subscribed services using the services of order provisioning module 1024.

In certain embodiments, order orchestration module 1022 enables the management of business processes associated with each order and applies business logic to determine whether an order should proceed to provisioning. At operation 1042, upon receiving an order for a new subscription, order orchestration module 1022 sends a request to order provisioning module 1024 to allocate resources and configure those resources needed to fulfill the subscription order. Order provisioning module 1024 enables the allocation of resources for the services ordered by the customer. Order provisioning module 1024 provides a level of abstraction between the cloud services provided by cloud infrastructure system 1000 and the physical implementation layer that is used to provision the resources for providing the requested services. Order orchestration module 1022 may thus be isolated from implementation details, such as whether or not services and resources are actually provisioned on the fly or pre-provisioned and only allocated/assigned upon request.

At operation 1044, once the services and resources are provisioned, a notification of the provided service may be sent to customers on client devices 1004, 1006 and/or 1008 by order provisioning module 1024 of cloud infrastructure system 1002.

At operation 1046, the customer's subscription order may be managed and tracked by an order management and monitoring module 1026. In some instances, order management and monitoring module 1026 may be configured to collect usage statistics for the services in the subscription order, such as the amount of storage used, the amount data transferred, the number of users, and the amount of system up time and system down time.

In certain embodiments, cloud infrastructure system 1000 may include an identity management module 1028. Identity management module 1028 may be configured to provide identity services, such as access management and authorization services in cloud infrastructure system 1000. In some embodiments, identity management module 1028 may control information about customers who wish to utilize the services provided by cloud infrastructure system 1002. Such information can include information that authenticates the identities of such customers and information that describes which actions those customers are authorized to perform relative to various system resources (e.g., files, directories, applications, communication ports, memory segments, etc.) Identity management module 1028 may also include the management of descriptive information about each customer and about how and by whom that descriptive information can be accessed and modified.

Figure 11:
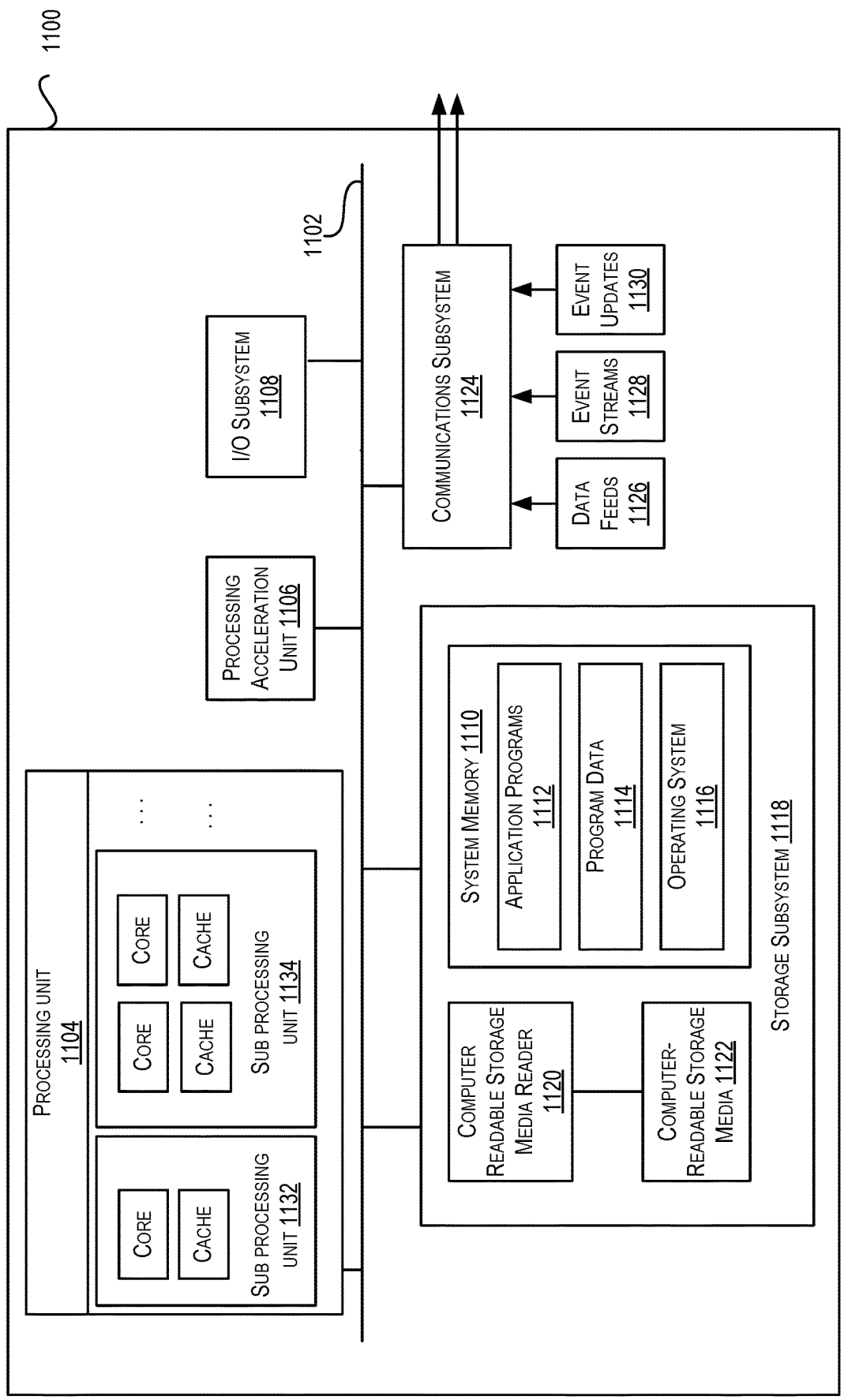
FIG. 11 illustrates an exemplary computer system, in which various embodiments of the present disclosure may be implemented in according with some of the examples described herein, according to at least one example.

FIG. 11 illustrates an exemplary computer system 1100, in which various embodiments of the present disclosure may be implemented. The system 1100 may be used to implement any of the computer systems described above. As shown in the figure, computer system 1100 includes a processing unit 1104 that communicates with a number of peripheral subsystems via a bus subsystem 1102. These peripheral subsystems may include a processing acceleration unit 1106, an I/O subsystem 1108, a storage subsystem 1118 and a communications subsystem 1124. Storage subsystem 1118 includes tangible computer-readable storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1104, which can be implemented as one or more integrated circuits (e.g., a conventional microprocessor or microcontroller), controls the operation of computer system 1100. One or more processors may be included in processing unit 1104. These processors may include single core or multicore processors. In certain embodiments, processing unit 1104 may be implemented as one or more independent processing units 1132 and/or 1134 with single or multicore processors included in each processing unit. In other embodiments, processing unit 1104 may also be implemented as a quad-core processing unit formed by integrating two dual-core processors into a single chip.

In various embodiments, processing unit 1104 can execute a variety of programs in response to program code and can maintain multiple concurrently executing programs or processes. At any given time, some or all of the program code to be executed can be resident in processor(s) 1104 and/or in storage subsystem 1118. Through suitable programming, processor(s) 1104 can provide various functionalities described above. Computer system 1100 may additionally include a processing acceleration unit 1106, which can include a digital signal processor (DSP), a special-purpose processor, and/or the like.

I/O subsystem 1108 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1100 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1100 may comprise a storage subsystem 1118 that comprises software elements, shown as being currently located within a system memory 1110. System memory 1110 may store program instructions that are loadable and executable on processing unit 1104, as well as data generated during the execution of these programs.

Depending on the configuration and type of computer system 1100, system memory 1110 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1104. In some implementations, system memory 1110 may include multiple different types of memory, such as static random access memory (SRAM) or dynamic random access memory (DRAM). In some implementations, a basic input/output system (BIOS), containing the basic routines that help to transfer information between elements within computer system 1100, such as during start-up, may typically be stored in the ROM. By way of example, and not limitation, system memory 1110 also illustrates application programs 1112, which may include client applications, Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 11 OS, and Palm® OS operating systems.

Storage subsystem 1118 may also provide a tangible computer-readable storage medium for storing the basic programming and data constructs that provide the functionality of some embodiments. Software (programs, code modules, instructions) that when executed by a processor provide the functionality described above may be stored in storage subsystem 1118. These software modules or instructions may be executed by processing unit 1104. Storage subsystem 1118 may also provide a repository for storing data used in accordance with the present disclosure.

Storage subsystem 1100 may also include a computer-readable storage media reader 1120 that can further be connected to computer-readable storage media 1122. Together and, optionally, in combination with system memory 1110, computer-readable storage media 1122 may comprehensively represent remote, local, fixed, and/or removable storage devices plus storage media for temporarily and/or more permanently containing, storing, transmitting, and retrieving computer-readable information.

Computer-readable storage media 1122 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 1100.

By way of example, computer-readable storage media 1122 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1122 may include, but is not limited to, Zip® drives, flash memory cards, universal serial bus (USB) flash drives, secure digital (SD) cards, DVD disks, digital video tape, and the like. Computer-readable storage media 1122 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to connect to one or more devices via the Internet. In some embodiments communications subsystem 1124 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 902.11 family standards, or other mobile communication technologies, or any combination thereof), global positioning system (GPS) receiver components, and/or other components. In some embodiments communications subsystem 1124 can provide wired network connectivity (e.g., Ethernet) in addition to or instead of a wireless interface.

In some embodiments, communications subsystem 1124 may also receive input communication in the form of structured and/or unstructured data feeds 1126, event streams 1128, event updates 1130, and the like on behalf of one or more users who may use computer system 1100.

By way of example, communications subsystem 1124 may be configured to receive data feeds 1126 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 1124 may also be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1124 may also be configured to output the structured and/or unstructured data feeds 1126, event streams 1128, event updates 1130, and the like to one or more databases that may be in communication with one or more streaming data source computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1100 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed:

1. A method, comprising:
receiving, by a computer system, a query to be executed against an event stream, the query comprising a query operator;
determining, by the computer system, a state type of the query operator, wherein the state type is one of a plurality of state types comprising a fully stateful state type, a stateless state type, and a semi-stateful state type, wherein the fully stateful state type comprises a query with operators in a query plan that maintain state and requires that the event stream be present on each node of the plurality of distributed nodes, wherein the stateless state type comprises a query with operators in the query plan that do not maintain any state, and wherein the semi-stateful state type comprises a query with operators in the query plan that maintain state and does not require that the event stream be present on each node of the plurality of distributed nodes; and
in accordance with a determination that the query operator is of the fully stateful state type:
categorizing, by the computer system, the query operator as fully stateful;
storing, by the computer system, an association between the categorization and the query operator;
dividing, by the computer system, the query into a partial aggregator and a global aggregator;
distributing, by the computer system, the partial aggregator to each node of a plurality of distributed nodes of a cluster of virtual machines;
enabling, by the computer system, parallel execution of each partial aggregator at each node of the plurality of distributed nodes;
enabling, by the computer system, execution results of each partial aggregator to be joined at a global node; and
enabling, by the computer system, the global aggregator to compute a result at the global node that includes each of the execution results from each node of the plurality of distributed nodes.

2. The method of claim 1, further comprising:
in accordance with a determination that the query operator is of the semi-stateful state type or the stateless state type:
categorizing, by the computer system, the query operator as semi-stateful or stateless, respectively;
storing, by the computer system, a second association between the categorization and the query operator;
distributing, by the computer system, the query to each node of the plurality of distributed nodes of the cluster of virtual machines;
enabling, by the computer system, parallel execution of the separate instances of the query at each node of the plurality of distributed nodes;
enabling, by the computer system, execution results of each instance of the query to be joined at the global node; and
enabling, by the computer system, the global node that includes each of the execution results from each node of the plurality of distributed nodes to compute a semi-stateful result or a stateless result based at least in part on whether the query operator was semi-stateful or stateless, respectively.

3. The method of claim 1, wherein the query is determined to be fully stateful if the query:
has a pattern clause; and
the pattern clause does not have a "partition by" sub-clause.

4. The method of claim 1, wherein the query is determined to be fully stateful if the query:
has an aggregation function in the select clause; and
a "group by" sub-clause is not present.

5. The method of claim 1, wherein the query is determined to be fully stateful if:
the query has a Distinct clause; or
the query has an Order By clause; or
the query has a RangeWindow clause.

6. The method of claim 1, wherein the query is determined to be semi-stateful if the query:
has a window construct; and
a type of the window construct is associated with "partition".

7. The method of claim 1, wherein the query is determined to be semi-stateful if the query:
has a pattern clause; and
the pattern clause has a "partition by" sub-clause.

8. The method of claim 1, wherein the query is determined to be semi-stateful if the query:
has an aggregation function in the select clause; and
a "group by" sub-clause is present.

9. One or more non-transitory computer-readable storage medium, storing computer-executable instructions that, when executed by a computer system, configure to the computer system to perform operations comprising:
receiving a query to be executed against an event stream, the query comprising a query operator;
determining a state type of the query operator, wherein the state type is one of a plurality of state types comprising a fully stateful state type, a stateless state type, and a semi-stateful state type, wherein the fully stateful state type comprises a query with operators in a query plan that maintain state and requires that the event stream be present on each node of the plurality of distributed nodes, wherein the stateless state type comprises a query with operators in the query plan that do not maintain any state, and wherein the semi-stateful state type comprises a query with operators in the query plan that maintain state and does not require that the event stream be present on each node of the plurality of distributed nodes; and in accordance with a determination that the query operator is of the fully stateful state type:
categorizing the query operator as fully stateful;
storing, by the computer system, an association between the categorization and the query operator;
dividing the query into a partial aggregator and a global aggregator;
distributing the partial aggregator to each node of a plurality of distributed nodes of a cluster of virtual machines;
enabling parallel execution of each partial aggregator at each node of the plurality of distributed nodes;
enabling execution results of each partial aggregator to be joined at a global node; and
enabling the global aggregator to compute a result at the global node that includes each of the execution results from each node of the plurality of distributed nodes.

10. The one or more non-transitory computer-readable storage medium of claim 9, wherein the query is determined to be fully stateful if the query:
has a window construct; and
a type of the window construct is associated with "row," "value," or "value relation".

11. The one or more non-transitory computer-readable storage medium of claim 9, further comprising in accordance with a determination that the query operator is of the semi-stateful state type or the stateless state type:
distributing the query to each node of the plurality of distributed nodes of the cluster of virtual machines;
enabling parallel execution of the separate instances of the query at each node of the plurality of distributed nodes;
enabling execution results of each instance of the query to be joined at the global node; and
enabling the global node that includes each of the execution results from each node of the plurality of distributed nodes to compute a semi-stateful result or a stateless result based at least in part on whether the query operator was semi-stateful or stateless, respectively.

12. The one or more non-transitory computer-readable storage medium of claim 9, wherein the query is determined to be semi-stateful if:
the query:
has a window construct; and
a type of the window construct is associated with "partition;' or
the query:
has a pattern clause; and
the pattern clause has a "partition by" sub-clause; or
the query:
has an aggregation function in the select clause; and
a "group by" sub-clause is present.

13. A system, comprising:
memory storing computer-executable instructions; and
one or more processors configured to access the memory and perform computer-executable instructions to at least:
receive a query to be executed against an event stream, the query comprising a query operator;
determine a state type of the query operator, wherein the state type is one of a plurality of state types comprising a fully stateful state type, a stateless state type, and a semi-stateful state type, wherein the fully stateful state type comprises a query with operators in a query plan that maintain state and requires that the event stream be present on each node of the plurality of distributed nodes, wherein the stateless state type comprises a query with operators in the query plan that do not maintain any state, and wherein the semi-stateful state type comprises a query with operators in the query plan that maintain state and does not require that the event stream be present on each node of the plurality of distributed nodes; and in accordance with a determination that the query operator is of the fully stateful state type:
categorize the query operator as fully stateful;
store an association between the categorization and the query operator;
divide the query into a partial aggregator and a global aggregator;
distribute the partial aggregator to each node of a plurality of distributed nodes of a cluster of virtual machines;
enable parallel execution of each partial aggregator at each node of the plurality of distributed nodes;
enable execution results of each partial aggregator to be joined at a global node; and
enable the global aggregator to compute a result at the global node that includes each of the execution results from each node of the plurality of distributed nodes.

14. The system of claim 13, further comprising in accordance with a determination that the query operator is of the semi-stateful state type or the stateless state type:
distributing the query to each node of the plurality of distributed nodes of the cluster of virtual machines;
enabling parallel execution of the separate instances of the query at each node of the plurality of distributed nodes;
enabling execution results of each instance of the query to be joined at the global node; and
enabling the global node that includes each of the execution results from each node of the plurality of distributed nodes to compute a semi-stateful result or a stateless result based at least in part on whether the query operator was semi-stateful or stateless, respectively.

15. The system of claim 13, wherein the query is determined to be fully stateful based at least in part on:
the query:
having a window construct; and
a type of the window construct being associated with "row," "value," or "value relation," or
the query:
having a pattern clause; and
the pattern clause not having a "partition by" sub-clause, or
the query:
having an aggregation function in the select clause; and
a "group by" sub-clause not being present.

16. The system of claim 13, wherein the query is determined to be semi-stateful based at least in part on:
the query:
having a window construct; and
a type of the window construct is associated with "partition;" or the query:
- having a pattern clause; and
- the pattern clause having a "partition by" sub-clause; or the query:
- having an aggregation function in the select clause; and
- a "group by" sub-clause being present.

17. The system of claim 13, wherein the query is parallelized only when the query is determined to be stateless or semi-stateful.

* * * * *

UNITED STATES PATENT AND TRADEMARK OFFICE
CERTIFICATE OF CORRECTION

PATENT NO. : 11,243,964 B2
APPLICATION NO. : 16/376984
DATED : February 8, 2022
INVENTOR(S) : Unmesh Anil Deshmukh et al.

It is certified that error appears in the above-identified patent and that said Letters Patent is hereby corrected as shown below:

On the Title Page

Item (56) References Cited, Other Publications

At Column 2, page 2, Line 20, delete "at" and insert -- at: --, therefor.

In the Drawings

At Sheet 5 of 11, Event App 520, in Fig. 5, delete "CQ Engine" and insert -- CQL Engine --, therefor In the Specification At Column 3, Line 12, after "nodes" insert -- . --, therefor.

At Column 5, Line 19, after "CEP" insert -- . --, therefor.

At Column 12, Line 17, after "query" insert -- . --, therefor.

At Column 20, Line 57, delete "CQLEngine" and insert -- CQL Engine --, therefor.

At Column 23, Line 35, after "query" insert -- of the CQL engine --, therefore.

At Column 35, Line 57, delete "computer readable" and insert -- computer-readable --, therefor.

In the Claims

In Column 39, Line 50, In Claim 12, delete ""partition;"" and insert -- "partition;" --, therefor.

Signed and Sealed this
Seventeenth Day of September, 2024

Katherine Kelly Vidal
*Director of the United States Patent and Trademark Office*